US012236576B2

(12) United States Patent
Yahashi et al.

(10) Patent No.: US 12,236,576 B2
(45) Date of Patent: Feb. 25, 2025

(54) WORKPIECE SURFACE DEFECT DETECTION DEVICE AND DETECTION METHOD, WORKPIECE SURFACE INSPECTION SYSTEM, AND PROGRAM

(71) Applicant: Konica Minolta, Inc., Tokyo (JP)

(72) Inventors: Akira Yahashi, Kobe (JP); Yoshihito Souma, Sakai (JP); Taizo Wakimura, Kishiwada (JP); Ryuichi Yoshida, Sakai (JP); Shota Ueki, Toyonaka (JP)

(73) Assignee: Konica Minolta, Inc., Tokyo (JP)

( * ) Notice: Subject to any disclaimer, the term of this patent is extended or adjusted under 35 U.S.C. 154(b) by 378 days.

(21) Appl. No.: 17/639,396

(22) PCT Filed: Oct. 2, 2019

(86) PCT No.: PCT/JP2019/038908
§ 371 (c)(1),
(2) Date: Mar. 1, 2022

(87) PCT Pub. No.: WO2021/064893
PCT Pub. Date: Apr. 8, 2021

(65) Prior Publication Data
US 2022/0335586 A1    Oct. 20, 2022

(51) Int. Cl.
*G06T 7/00* (2017.01)
*G06T 7/11* (2017.01)
(Continued)

(52) U.S. Cl.
CPC ............... *G06T 7/001* (2013.01); *G06T 7/11* (2017.01); *G06T 7/70* (2017.01); *G06T 11/00* (2013.01);
(Continued)

(58) Field of Classification Search
CPC ............. G06T 7/001; G06T 7/11; G06T 7/70; G06T 11/00; G06T 2207/10152;
(Continued)

(56) References Cited

U.S. PATENT DOCUMENTS

| 7,639,349 B2 | 12/2009 | Ersue et al. |
| 2004/0207836 A1 * | 10/2004 | Chhibber ............ G01N 21/8806 356/237.4 |
| 2017/0277979 A1 | 9/2017 | Allen et al. |

FOREIGN PATENT DOCUMENTS

| JP | H07270323 A | 10/1995 |
| JP | H10318938 A | 12/1998 |

(Continued)

OTHER PUBLICATIONS

International Search Report (ISR) dated Dec. 17, 2019 filed in PCT/JP2019/038908.
(Continued)

*Primary Examiner* — Hwa Andrew Lee
(74) *Attorney, Agent, or Firm* — RANKIN, HILL & CLARK LLP

(57) ABSTRACT

A workpiece surface defect detection device or the like that is capable of stably detecting a small surface defect with high accuracy is provided. A plurality of images indicating a portion to be measured of a workpiece serving as a target of detection of a surface defect is obtained in a state where a bright-and-dark pattern of an illumination device is moved relative to the workpiece, and a tentative defect candidate is extracted. When among a plurality of images from which the tentative defect candidate has been extracted, the number of images including the tentative defect candidate is greater than or equal to a threshold that has been set in advance, the tentative defect candidate is determined as a defect candidate. A plurality of images including the determined defect
(Continued)

candidate is combined to generate a composite image, and a defect is detected on the basis of the generated composite image.

24 Claims, 21 Drawing Sheets

(51) Int. Cl.
  *G06T 7/70* (2017.01)
  *G06T 11/00* (2006.01)
(52) U.S. Cl.
  CPC ............... *G06T 2207/10152* (2013.01); *G06T 2207/20132* (2013.01); *G06T 2207/30164* (2013.01)
(58) Field of Classification Search
  CPC ........... G06T 2207/20132; G06T 2207/30164; G06T 2207/10016; G06T 7/0004
  See application file for complete search history.

(56) References Cited

FOREIGN PATENT DOCUMENTS

| JP | 11-118731 A | 4/1999 |
| JP | H11118731 A | 4/1999 |
| JP | 2000172845 A | 6/2000 |
| JP | 3156602 B2 | 4/2001 |
| JP | 2006220644 A | 8/2006 |
| JP | 2010-151824 A | 7/2010 |
| JP | 2016223911 A | 12/2016 |

OTHER PUBLICATIONS

PCT Written Opinion of the International Searching Authority dated Dec. 17, 2019 filed in PCT/JP2019/038908.
Japanese Office Action (JPOA) issued on Aug. 1, 2023 and issued in Japanese Patent Application No. 2020-140283 and its English machine translation.

* cited by examiner

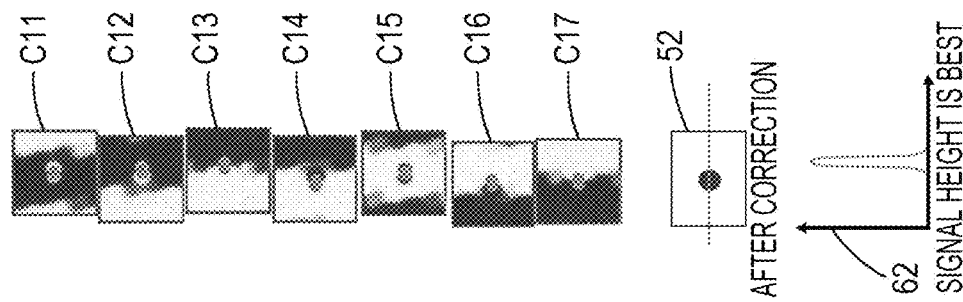
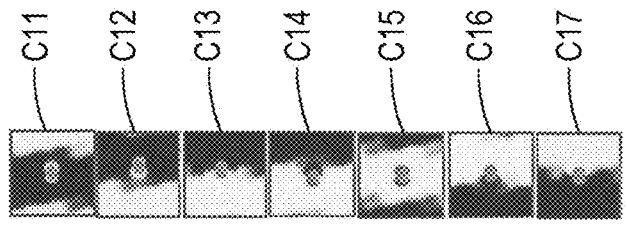
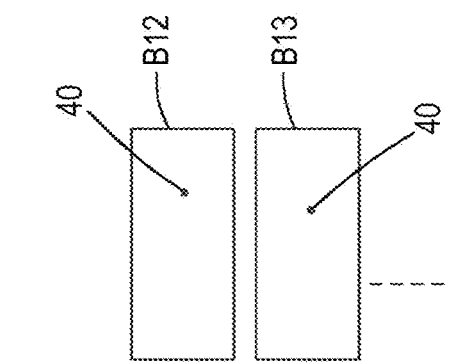
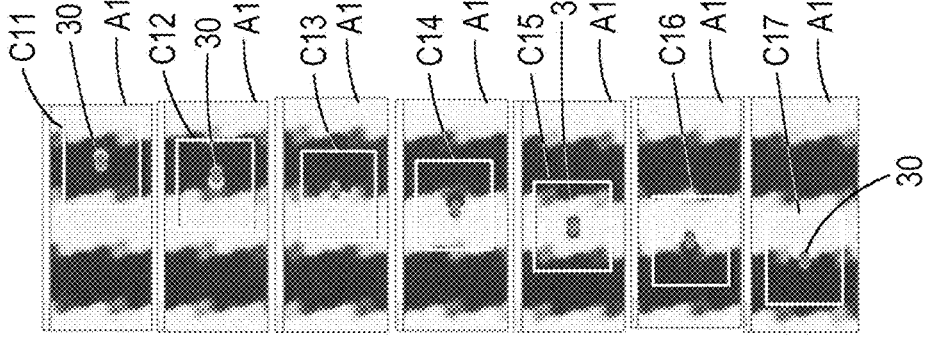

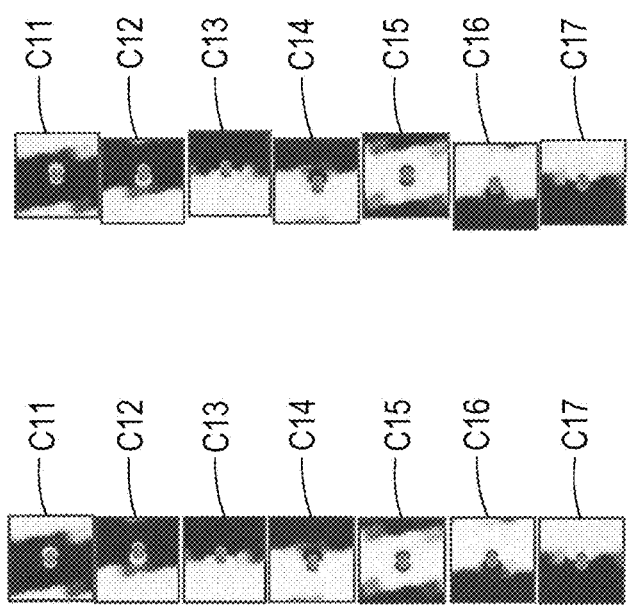
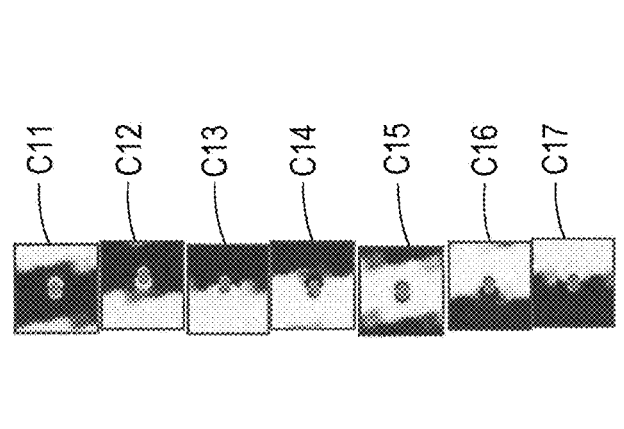
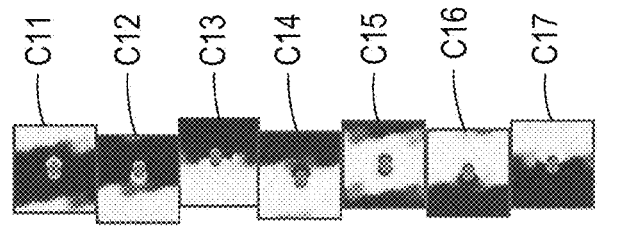
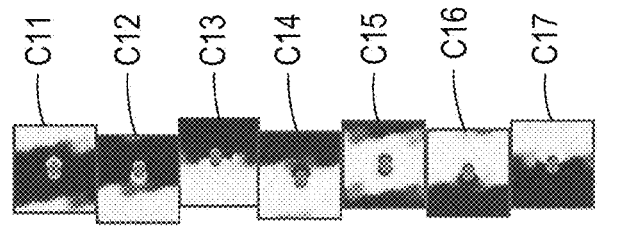
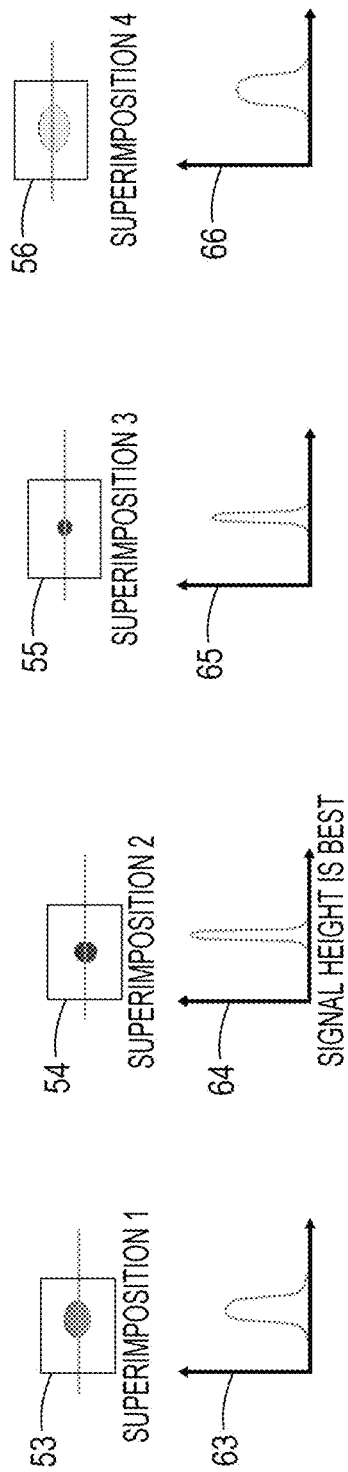

FIG. 9A
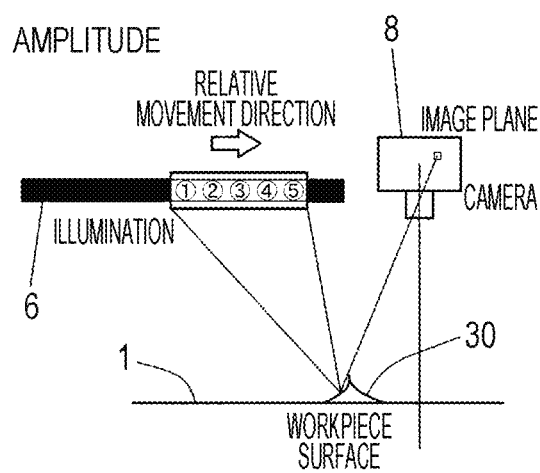
TIME-SERIES DATA
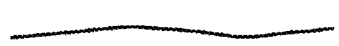
AMPLITUDE IMAGE CROSS SECTION
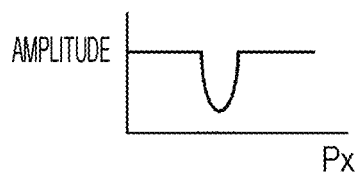
FIG. 9B
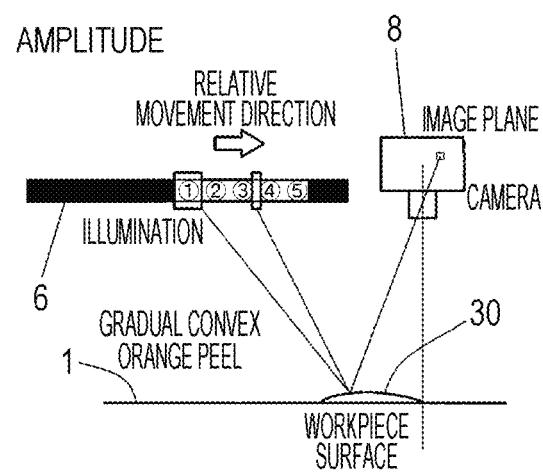
TIME-SERIES DATA
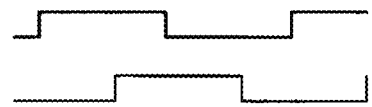
PHASE IMAGE CROSS SECTION
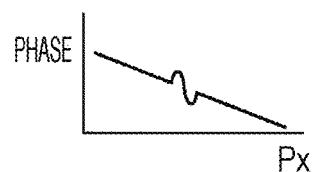

WORKPIECE SURFACE DEFECT DETECTION DEVICE AND DETECTION METHOD, WORKPIECE SURFACE INSPECTION SYSTEM, AND PROGRAM

TECHNICAL FIELD

The present invention relates to a workpiece surface defect detection device and a detection method, a workpiece surface inspection system, and a program that detect a surface defect on the basis of a plurality of images obtained when imaging means has continuously imaged a portion to be measured, for example, a coated surface of a workpiece, such as a vehicle body, that serves as a target of detecting the surface defect in a state where the portion to be measured is irradiated with illumination light having a bright-and-dark pattern while the workpiece is being moved relative to an illumination device.

BACKGROUND ART

Patent Literature 1 is known as a technology for detecting a surface defect of a workpiece, such as a vehicle body, by causing imaging means to continuously image a portion to be measured of the workpiece while moving the workpiece relative to an illumination device, as described above. However, in the technology described in Patent Literature 1, a specific defect detection algorithm using an image obtained by the imaging means is not described.

In addition, Patent Literature 2 describes that a plurality of images is fused into a single image, and a surface defect is detected.

Further, Patent Literature 3 has proposed a defect inspection method for a surface to be inspected that is capable of detecting a defect with high accuracy, by processing a plurality of images obtained in time series and detecting a defect on the basis of a state of movement of a detect candidate point that has been extracted from each of the plurality of images. Specifically, a surface to be inspected 1 is moved in such a way that a portion to be imaged A of the surface to be inspected 1 moves with the lapse of time, an image from imaging means 2 is input at every arbitrary time, a defect candidate point B is extracted from each of two input images that change in imaging time, an error range is set around a defect candidate point B in an image that has been imaged later, a defect candidate point B in an image that has been imaged earlier is moved according to a distance of movement of the surface to be inspected or the imaging means, a defect candidate point that is closest to the moved defect candidate point B from among defect candidate points within the error range is determined as a matching candidate, the processing described above is performed on a plurality of images captured in time series, and a defect candidate point B that has been determined as the matching candidate a predetermined number of times or more is determined to be a defect on the surface to be inspected 1.

CITATION LIST

Patent Literature

Patent Literature 1: U.S. Pat. No. 7,639,349
Patent Literature 2: US 2017/0,277,979 A
Patent Literature 3: JP 3156602 B2

SUMMARY OF INVENTION

Technical Problem

However, the inspection method described in Patent Literature 2 has a problem in which defect detection processing is complicated, and for example, first to third conversion processes that are different from each other need to be performed.

In addition, the inspection method described in Patent Literature 3 has a problem in which processing based on a single image is basically performed, an amount of information is insufficient, and a small surface defect fails to be identified with satisfactory accuracy.

The present invention has been made to solve such problems, and it is an object of the present invention to provide a workpiece surface defect detection device and a detection method, a workpiece surface inspection system, and a program that are capable of stably detecting a small surface defect with high accuracy without the need for a plurality of complicated conversion processes or the like.

Solution to Problem

The object described above is achieved by means described below.

(1) A workpiece surface defect detection device including: image obtaining means that obtains a plurality of images indicating a portion to be measured of a workpiece serving as a target of detection of a surface defect, in a state where a bright-and-dark pattern of an illumination device is moved relative to the workpiece; tentative defect candidate extraction means that extracts a tentative defect candidate for each of the plurality of images that has been obtained by the image obtaining means; defect candidate determination means that determines the tentative defect candidate as a defect candidate, when among a plurality of images from which the tentative defect candidate has been extracted by the tentative defect candidate extraction means, the number of images including the tentative defect candidate is greater than or equal to a threshold that has been set in advance; image composition means that combines a plurality of images including the defect candidate that has been determined by the defect candidate determination means, and generates a composite image; and detection means that detects a defect on the basis of the composite image that has been generated by the image composition means.

(2) The workpiece surface defect detection device according to item 1 described above, in which when it is assumed that the threshold is a first threshold, the defect candidate determination means cancels processing for determining the tentative defect candidate as the defect candidate, when in the middle of the processing for determining the tentative defect candidate as the defect candidate, the number of images including the tentative defect candidate has not reached a second threshold that has been set in advance to be smaller than the first threshold.

(3) The workpiece surface defect detection device according to item 1 or 2 described above, in which the defect candidate determination means determines the tentative defect candidate as the defect candidate, when among the plurality of images, the number of images that correspond to a position of the tentative defect candidate is greater than or equal to a threshold that has been set in advance.

(4) The workpiece surface defect detection device according to item 3 described above, in which the position of the tentative defect candidate is indicated by coordinates of the tentative defect candidate, the device further includes coordinate estimation means that obtains the coordinates of the tentative defect candidate that has been extracted by the tentative defect candidate extraction means, and obtains estimated coordinates for each of a plurality of images that follows an image from which the tentative defect candidate has been extracted, by computing which coordinates the coordinates of the tentative defect candidate will move to, and the defect candidate determination means determines, in each of the plurality of images that follows, whether the estimated coordinates that have been computed by the coordinate estimation means correspond to the tentative defect candidate in a corresponding image, and determines the tentative defect candidate as the defect candidate, when from among the plurality of images that follows, the number of images in which the estimated coordinates correspond to the tentative defect candidate is greater than or equal to a threshold that has been set in advance.

(5) The workpiece surface defect detection device according to any of items 1 to 4 described above, further including: image group generation means that cuts out, for each of a plurality of the defect candidates determined by the defect candidate determination means, a predetermined region around the defect candidate as an estimated region from a plurality of images including the defect candidate, and generates a plurality of estimated region image groups, in which the image composition means combines a plurality of estimated region images that has been generated by the image group generation means, and generates the composite image, for each of the plurality of the defect candidates.

(6) The workpiece surface defect detection device according to any of items 1 to 5 described above, in which the composite image is at least any of a standard deviation image, a phase image, a phase difference image, a maximum value image, a minimum value image, and a mean value image.

(7) The workpiece surface defect detection device according to item 5 described above, in which when generating the composite image, the image composition means aligns the plurality of estimated region images by superimposing center coordinates of each of the plurality of images.

(8) The workpiece surface defect detection device according to item 7 described above, in which the image composition means corrects the center coordinates of each of the plurality of images on the basis of a position of each of the center coordinates from a boundary of a bright-and-dark pattern of each of the plurality of images that corresponds to the bright-and-dark pattern of the illumination device, and superimposes the center coordinates after correction.

(9) The workpiece surface defect detection device according to any of items 5 to 8 described above, in which when generating the composite image, the image composition means aligns the plurality of estimated region images to gain a maximum evaluation value from among a plurality of combinations obtained by respectively shifting the center coordinates of each of the plurality of images in X-coordinate and Y-coordinate directions.

(10) The workpiece surface defect detection device according to any of items 1 to 9 described above, in which the tentative defect candidate extraction means extracts the tentative defect candidate according to at least two types of routines including a routine for extracting a small defect and a processing routine for extracting a gradual convex defect, and corrects a defect size of the tentative defect candidate that has been detected according to a routine for the gradual convex defect.

(11) The workpiece surface defect detection device according to any of items 1 to 10 described above, in which the detection means identifies filiform grains on the basis of an amount of deviation from circularity of a two-dimensional shape of a two-dimensional defect signal in a phase image of the defect candidate.

(12) A workpiece surface inspection system including: an illumination device that applies illumination light having a bright-and-dark pattern to a workpiece serving as a target of detection of a surface defect; imaging means that images reflected light from a portion to be measured of the workpiece of the illumination light applied by the illumination device; movement means that moves the bright-and-dark pattern applied by the illumination device relative to the workpiece; control means that controls the imaging means to image the portion to be measured of the workpiece, while causing the movement means to move the bright-and-dark pattern applied by the illumination device relative to the workpiece; and the workpiece surface defect detection device according to any of items 1 to 11 described above, in which the image obtaining means obtains, from the imaging means, a plurality of images indicating the portion to be measured of the workpiece.

(13) A workpiece surface defect detection method, in which a workpiece surface defect detection device performs: an image obtaining step of obtaining a plurality of images indicating a portion to be measured of a workpiece serving as a target of detection of a surface defect, in a state where a bright-and-dark pattern of an illumination device is moved relative to the workpiece; a tentative defect candidate extraction step of extracting a tentative defect candidate for each of the plurality of images that has been obtained in the image obtaining step; a defect candidate determination step of determining the tentative defect candidate as a defect candidate, when from among a plurality of images from which the tentative defect candidate has been extracted in the tentative defect candidate extraction step, the number of images including the tentative defect candidate is greater than or equal to a threshold that has been set in advance; an image composition step of combining a plurality of images including the defect candidate that has been determined in the defect candidate determination step, and generating a composite image; and a detection step of detecting a defect on the basis of the composite image that has been generated in the image composition step.

(14) The workpiece surface defect detection method according to item 13 described above, in which when it is assumed that the threshold is a first threshold, the defect candidate determination step cancels processing for determining the tentative defect candidate as the defect candidate, when in the middle of the processing for determining the tentative defect candidate as the defect candidate, the number of images including the tentative defect candidate has not reached a second threshold that has been set in advance to be smaller than the first threshold.

(15) The workpiece surface defect detection method according to item 13 or 14 described above, in which in the defect candidate determination step, the tentative defect candidate is determined as the defect candidate, when from among the plurality of images, the number of images that correspond to a position of the tentative defect candidate is greater than or equal to a threshold that has been set in advance.

(16) The workpiece surface defect detection method according to item 15 described above, in which the position of the tentative defect candidate is indicated by coordinates of the tentative defect candidate, a the method further includes a coordinate estimation step of obtaining the coordinates of the tentative defect candidate that has been extracted in the tentative defect candidate extraction step, and obtaining estimated coordinates for each of a plurality of images that follows an image from which the tentative defect candidate has been extracted, by computing which coordinates the coordinates of the tentative defect candidate will move to, and in the defect candidate determination step, in each of the plurality of images that follows, it is determined whether the estimated coordinates that have been computed in the coordinate estimation step correspond to the tentative defect candidate in a corresponding image, and the tentative defect candidate is determined as the defect candidate, when from among the plurality of images that follows, the number of images in which the estimated coordinates correspond to the tentative defect candidate is greater than or equal to a threshold that has been set in advance.

(17) The workpiece surface defect detection method according to any of items 13 to 16 described above, further including: an image group generation step of cutting out, for each of a plurality of the defect candidates determined in the defect candidate determination step, a predetermined region around the defect candidate as an estimated region from a plurality of images including the defect candidate, and generating a plurality of estimated region image groups, in which in the image composition step, a plurality of estimated region images that has been generated in the image group generation step is combined, and the composite image is generated, for each of the plurality of the defect candidates.

(18) The workpiece surface defect detection method according to any of items 13 to 17 described above, in which the composite image is at least any of a standard deviation image, a phase image, a phase difference image, a maximum value image, a minimum value image, and a mean value image.

(19) The workpiece surface defect detection method according to item 17 described above, in which in the image composition step, when the composite image is generated, the plurality of estimated region images is aligned by superimposing center coordinates of each of the plurality of images.

(20) The workpiece surface defect detection method according to item 19 described above, in which in the image composition step, the center coordinates of each of the plurality of images are corrected on the basis of a position of each of the center coordinates from a boundary of a bright-and-dark pattern of each of the plurality of images that corresponds to the bright-and-dark pattern of the illumination device, and the center coordinates after correction are superimposed.

(21) The workpiece surface defect detection method according to any of items 17 to 20 described above, in which in the image composition step, when the composite image is generated, the plurality of estimated region images is aligned to gain a maximum evaluation value from among a plurality of combinations obtained by respectively shifting the center coordinates of each of the plurality of images in X-coordinate and Y-coordinate directions.

(22) The workpiece surface defect detection method according to any of items 13 to 21 described above, in which in the tentative defect candidate extraction step, the tentative defect candidate is extracted according to at least two types of routines including a routine for extracting a small defect and a processing routine for extracting a gradual convex defect, and a defect size of the tentative defect candidate that has been detected according to a routine for the gradual convex defect is corrected.

(23) The workpiece surface defect detection method according to any of items 13 to 22 described above, in which in the detection step, filiform grains are identified on the basis of an amount of deviation from circularity of a two-dimensional shape of a two-dimensional defect signal in a phase image of the defect candidate.

(24) A program that causes a computer to perform the workpiece surface defect detection method according to any of items 13 to 23 described above.

Advantageous Effects of Invention

According to the inventions described in items (1), (12), and (13) described above, a plurality of images indicating a portion to be measured of a workpiece serving as a target of detection of a surface defect is obtained in a state where a bright-and-dark pattern of an illumination device is moved relative to the workpiece, and a tentative defect candidate is extracted for each of the obtained images. If from among a plurality of images from which the tentative defect candidate has been extracted, the number of images including the tentative defect candidate is greater than or equal to a threshold that has been set in advance, the tentative defect candidate is determined as a defect candidate, and a plurality of images including the determined defect candidate is combined to generate a composite image. Then, a defect is detected on the basis of the generated composite image.

Stated another way, a plurality of images including a defect candidate is combined into a single image, and a defect is detected on the basis of this composite image. Therefore, the composite image includes information relating to the plurality of images Thus, a defect can be detected by using a large amount of information relating to a single defect candidate. Therefore, even a small surface defect can be stably detected with high accuracy while over-detection and erroneous detection are avoided.

In addition, in a case where the number of images including a tentative defect candidate is greater than or equal to a threshold that has been set in advance, a composite image is generated, and a defect is detected. Therefore, a defect can be detected in a case where there is a high probability of the presence of a defect, and this results in a decrease in a processing load, improvements in the efficiency of detection, and improvements in the accuracy of detection.

Further, a plurality of conversion processes that is different from each other does not need to be performed on a fused image, as described in Patent Literature 2.

According to the inventions described in items (2) and (14) described above, the defect candidate determination means cancels processing for determining the tentative defect candidate as the defect candidate, when in the middle of the processing for determining the tentative defect candidate as the defect candidate, the number of images including the tentative defect candidate has not reached a second threshold that has been set in advance to be smaller than the first threshold. This prevents useless processing from continuing even in a case where there is not a high probability that the tentative defect candidate will be a defect candidate, a processing load is further reduced, and the accuracy of detection can be further improved.

According to the inventions described in items (3) and (15) described above, the tentative defect candidate is determined as the defect candidate, when from among the plurality of images, the number of images that correspond to a position of the tentative defect candidate is greater than or equal to a threshold that has been set in advance.

According to the inventions described in items (4) and (16) described above, the coordinates of the extracted tentative defect candidate are obtained, and estimated coordinates are obtained for each of a plurality of images that follows an image from which the tentative defect candidate has been extracted, by computing which coordinates the coordinates of the tentative defect candidate will move to, it is determined whether the estimated coordinates correspond to the tentative defect candidate in a corresponding image, and the tentative defect candidate is determined as the defect candidate, when from among the plurality of images that follows, the number of images in which the estimated coordinates correspond to the tentative defect candidate is greater than or equal to a threshold that has been set in advance. Therefore, it can be reliably determined whether from among the plurality of images, the number of images that correspond to a position of the tentative defect candidate is greater than or equal to a threshold that has been set in advance.

According to the inventions described in (5) and (17) described above, a plurality of estimated region images that has been cut out from a plurality of images including the defect candidate is combined into a single image, and a defect is detected on the basis of this composite image Therefore, only regions required to detect a defect can be combined, and a defect can be detected with high accuracy.

According to the inventions described in items (6) and (18) described above, a surface defect can be detected on the basis of a composite image that is at least any of a standard deviation image, a phase image, a phase difference image, a maximum value image, a minimum value image, and a mean value image.

According to the inventions described in items (7) and (19) described above, when the composite image is generated, the plurality of estimated region images is aligned by superimposing center coordinates of each of the images. Therefore, a composite image having high accuracy can be generated, and this enables a surface defect to be detected with high accuracy.

According to the inventions described in items (8) and (20) described above, the center coordinates of each of the plurality of images are corrected on the basis of a position of each of the center coordinates from a boundary of a bright-and-dark pattern of each of the plurality of images that corresponds to the bright-and-dark pattern of the illumination device, and the center coordinates after correction are superimposed. Therefore, the accuracy of a composite image can be further enhanced.

According to the inventions described in items (9) and (21) described above, when the composite image is generated, the plurality of estimated region images is aligned to gain a maximum evaluation value from among a plurality of combinations obtained by respectively shifting the center coordinates of each of the plurality of images in X-coordinate and Y-coordinate directions. Therefore, a composite image having higher accuracy can be generated, and this enables a surface defect to be detected with high accuracy.

According to the inventions described in items (10) and (22) described above, the tentative defect candidate is extracted according to at least two types of routines including a routine for extracting a small defect and a processing routine for extracting a gradual convex defect, and a defect size of the tentative defect candidate that has been detected according to a routine for the gradual convex defect is corrected. Therefore, a tentative defect candidate can be reliably extracted.

According to the inventions described in items (11) and (23) described above, filiform grains can be identified on the basis of an amount of deviation from circularity of a two-dimensional shape of a two-dimensional defect signal in a phase image of the defect candidate.

According to the invention described in (24) described above, a computer can be caused to perform processing for combining a plurality of images including a defect candidate into a single image, and detecting a defect on the basis of this composite image.

BRIEF DESCRIPTION OF DRAWINGS

FIG. 6A illustrates images that have been continuously obtained in time series from a single camera, FIG. 6B is a diagram illustrating a state where coordinates of a tentative defect candidate have been estimated in images that follow a first image in FIG. 6A, FIG. 6C is a diagram illustrating processing for generating a composite image by superimposing respective images of an estimated region image group onto each other, and FIG. 6D is a diagram illustrating other processing for generating the composite image by superimposing the respective images of the estimated region image group onto each other.

FIGS. 8A to 8D are diagrams illustrating processing for generating a composite image by superimposing respective images of an estimated region image group onto each other in a different aspect.

FIG. 9 is a diagram for explaining an example of tentative defect candidate extraction processing.

DESCRIPTION OF EMBODIMENTS

Embodiments of the present invention are described below with reference to the drawings.

Figure 1:
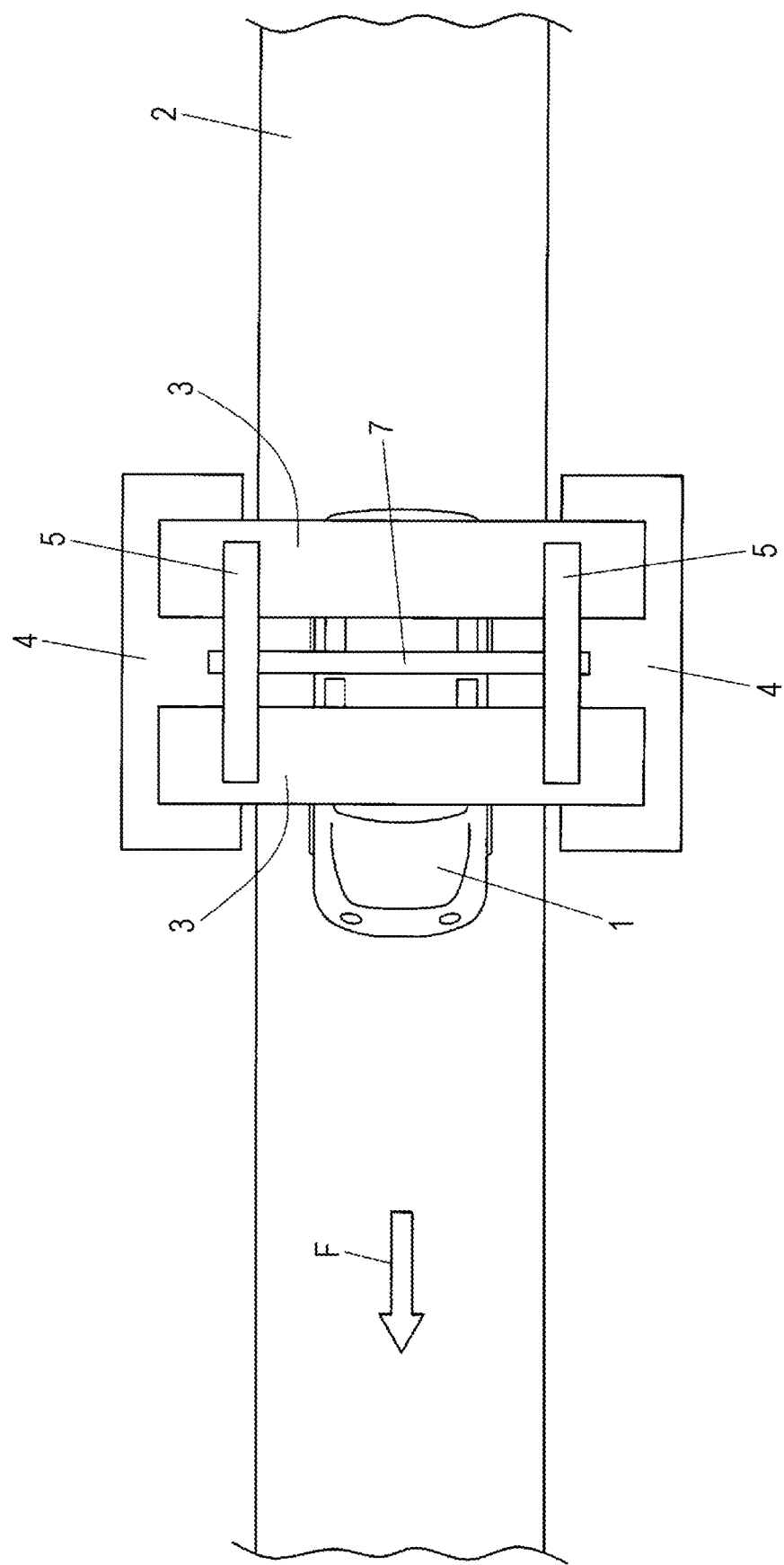
FIG. 1 is a plan view illustrating an example of a configuration of a workpiece surface inspection system according to an embodiment of the present invention.

FIG. 1 is a plan view illustrating an example of a configuration of a workpiece surface inspection system according to an embodiment of the present invention. The present embodiment indicates a case where a workpiece 1 is a vehicle body, a portion to be measured of the workpiece 1 is a coated surface on a surface of the vehicle body, and a surface defect of the coated surface is detected. In general, substrate treatment, metallic coating, clear coating, or the like is performed on a surface of a vehicle body, and a coating film layer having a multilayer structure is formed. A defect having an uneven shape is generated in a clear layer serving as an uppermost layer due to an influence of a foreign matter or the like during coating. The present embodiment is applied to the detection of such a defect, but the workpiece 1 is not limited to a vehicle body, and may be a workpiece other than the vehicle body. In addition, the portion to be measured may be a surface other than a coated surface.

This inspection system includes a workpiece moving mechanism 2 that continuously moves the workpiece 1 in a direction of arrow F at a predetermined speed. In an intermediated part in a longitudinal direction of the workpiece moving mechanism 2, two illumination frames 3 and 3 are attached on front and rear sides in a direction of movement of the workpiece in a state where both lower ends in a direction orthogonal to the direction of movement of the workpiece are fixed to support stands 4 and 4. In addition, the respective illumination frames 3 and 3 are coupled to each other by using two coupling members 5 and 5. The number of illumination frames is not limited to two.

Figure 2:
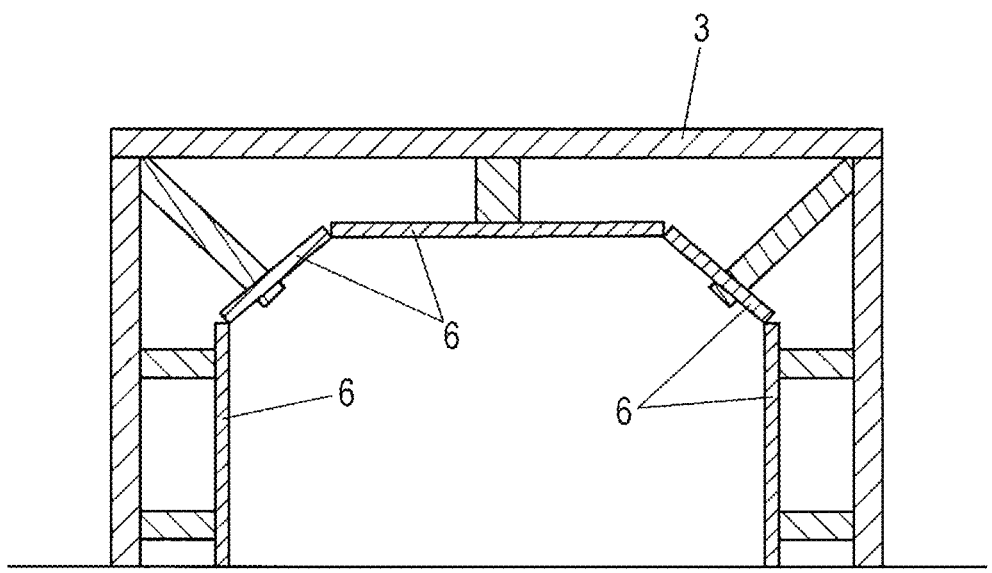
FIG. 2 is a vertical sectional view of an illumination frame when viewed from a front side in a traveling direction of a workpiece.

Each of the illumination frames 3 is formed in a portal shape, as illustrated in the vertical sectional view of FIG. 2, when viewed from a front side in a traveling direction of the vehicle body, and each of the illumination frames 3 is equipped with an illumination unit 6 that illuminates the workpiece 1. In the present embodiment, the illumination unit 6 includes a linear illumination part that has been attached to surround a peripheral surface excluding a lower surface of the workpiece 1 along an inside shape of the illumination frame 3, and a plurality of linear illumination parts is attached to the illumination frame 3 at equal intervals in the direction of movement of the workpiece 1. Accordingly, the illumination unit 6 illuminates the workpiece in a diffused manner with illumination light having a bright-and-dark striped pattern including an illumination part and a non-illumination part that are alternately present in the direction of movement of the workpiece 1. The illumination unit may have a curved surface.

Figure 3:
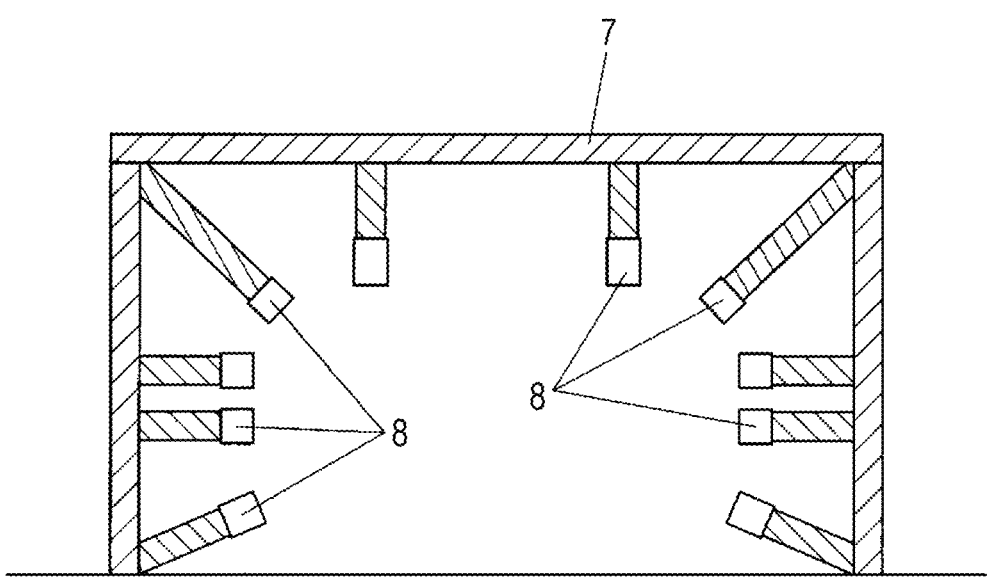
FIG. 3 is a vertical sectional view of a camera frame when viewed from the front side in the traveling direction of the workpiece.

In an intermediate part between the two illumination frames 3 and 3 on the front and rear sides, a camera frame 7 is attached in a state where both lower ends in the direction orthogonal to the direction of movement of the workpiece are fixed to the support stands 4 and 4. In addition, the camera frame 7 is formed in a portal shape, as illustrated in the vertical sectional view of FIG. 3, when viewed from a front side in the traveling direction of the workpiece 1, and the camera frame 7 is equipped with a plurality of cameras 8 serving as imaging means along an inside shape of the camera frame 7 in such a way that the plurality of cameras 8 surrounds the peripheral surface excluding the lower surface of the workpiece 1.

By employing such a configuration, the plurality of cameras 8 that has been attached to the camera frame 7 continuously images each part in a circumferential direction of the workpiece 1 as a portion to be measured, in a state where the workpiece moving mechanism 2 is moving the workpiece 1 at a predetermined speed, and the workpiece 1 is illuminated in a diffused manner with illumination light having a bright-and-dark striped pattern of the illumination unit 6. Imaging is performed in such a way that an imaging range in previous imaging mostly overlaps an imaging range in subsequent imaging. By doing this, each of the cameras 8 outputs a plurality of images in which a position of the portion to be measured in the workpiece 1 continuously shifts in the direction of movement of the workpiece 1.

Figure 4:
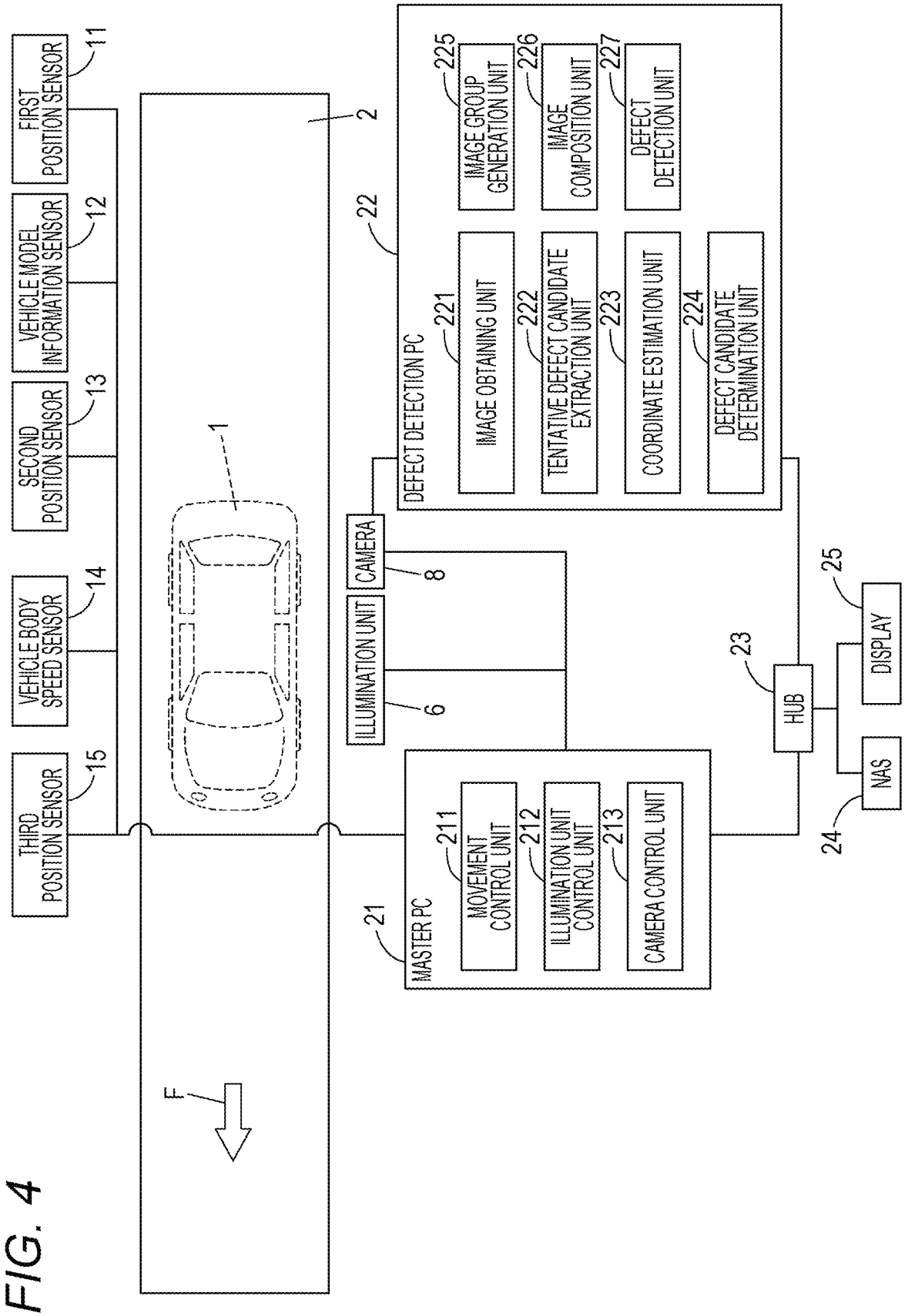
FIG. 4 is a plan view illustrating an electrical configuration of the workpiece surface inspection system illustrated in FIG. 1.

FIG. 4 is a plan view illustrating an electrical configuration of the workpiece surface inspection system illustrated in FIG. 1.

In a region of movement of the workpiece 1, a first position sensor 11, a vehicle model information sensing sensor 12, a second position sensor 13, a vehicle body speed sensor 14, and a third position sensor 15 are mounted in order from an entrance side along the direction of movement of the workpiece 1.

The first position sensor 11 is a sensor that detects that the next workpiece 1 has approached an inspection region. The vehicle model information sensing sensor 12 is a sensor that detects an ID, a vehicle model, color, destination information, or the like of a vehicle body serving as a target of inspection. The second position sensor 13 is a sensor that detects that a workpiece 1 has entered the inspection region. The vehicle body speed sensor 14 monitors a position of a workpiece 1 by sensing and calculating the speed of movement of the workpiece 1, but a position sensor may directly monitor the position of the workpiece. The third position sensor 15 is a sensor that detects that a workpiece 1 has exited from the inspection region.

The workpiece surface inspection system further includes a master PC 21, a defect detection PC 22, a HUB 23, a network attached storage (NAS) 24, a display 25, or the like.

The master PC 21 is a personal computer that comprehensively controls the entirety of the workpiece surface inspection system, and includes a processor such as a CPU, a memory such as a RAM, a storage device such as a hard disk, and other hardware and software. The master PC 21 includes a movement control unit 211, an illumination unit control unit 212, a camera control unit 213, or the like as one function of the CPU.

The movement control unit 211 controls a stop of movement, the speed of movement, or the like of the moving mechanism 2, the illumination unit control unit 212 performs lighting control on the illumination unit 6, and the camera control unit 213 performs imaging control on the camera 8. The camera 8 continuously performs imaging in response to a trigger signal that has been continuously transmitted from the master PC 21 to the camera 8.

The defect detection PC 22 is a surface defect detection device that performs surface defect detection processing, and is constituted of a personal computer that includes a processor such as a CPU, a memory such as a RAM, a storage device such as a hard disk, and other hardware and software. The defect detection PC 22 includes an image obtaining unit 221, a tentative defect candidate extraction unit 222, a coordinate estimation unit 223, a defect candidate determination unit 224, an image group generation unit 225, an image composition unit 226, a defect detection unit 227, or the like as one function of the CPU.

The image obtaining unit 221 obtains a plurality of images that has been continuously captured in time series by the camera 8 and has been transmitted from the camera 8 via gigabit Ethernet (GigE (registered trademark)). The tentative defect candidate extraction unit 222 extracts a tentative defect candidate on the basis of the plurality of images that has been obtained by the image obtaining unit 221 and has been transmitted from the camera 8, and the coordinate estimation unit 223 estimates coordinates of the extracted tentative defect candidate in an image that follows. The defect candidate determination unit 224 matches the estimated coordinates of the tentative defect candidate with an actual tentative defect candidate to determine a defect candidate, and the image group generation unit 225 cuts out a region around the determined defect candidate, and generates an image group including a plurality of images for image composition. The image composition unit 226 combines respective images of the generated image group to obtain a single image, and the defect detection unit 227 detects and identifies a defect from a composite image. Specific surface defect detection processing performed by these respective units of the defect detection PC 22 will be described below.

The NAS 24 is a storage device on a network, and stores various types of data. The display 25 displays a surface defect that has been detected by the defect detection PC 22, in a state that corresponds to positional information of the vehicle body serving as the workpiece 1, and the HUB 23 has a function of receiving/transmitting data from/to the master PC 21, the defect detection PC 22, the NAS 24, the display 25, or the like.

Next, defect detection processing performed by the defect detection PC 22 is described.

In a state where the illumination unit 6 illuminates the workpiece 1 from the periphery with illumination light having a bright-and-dark pattern while the moving mechanism 2 is moving the workpiece 1 at a predetermined speed, a trigger signal is continuously transmitted from the master PC 21 to each of the cameras 8, and each of the cameras 8 continuously images a portion to be measured in the workpiece 1. The master PC 21 sets an imaging interval, that is, an interval between trigger signals in such a way that an imaging range in previous imaging mostly overlaps an imaging range in subsequent imaging. By performing such imaging, a plurality of images in which a position of the portion to be measured in the workpiece 1 continuously shifts in the direction of movement according to a movement of the workpiece 1 is obtained from each of the cameras 8.

The plurality of images, as described above, cannot only be obtained from the camera 8 in a case where only the workpiece 1 moves relative to the illumination unit 6 and the camera 8 that are fixed, as described in the present embodiment, but can also be obtained from the camera 8 in a case where the workpiece 1 is fixed and the illumination unit 6 and the camera 8 are moved relative to the workpiece 1 or in a case where the workpiece 1 and the camera 8 are fixed and the illumination unit 6 is moved. Stated another way, it is sufficient if the bright-and-dark pattern of the illumination unit 6 moves relative to the workpiece 1, by moving at least one of the workpiece 1 and the illumination unit 6.

The plurality of images obtained by each of the cameras 8 is transmitted to the defect detection PC 22, and the image obtaining unit 221 of the defect detection PC 22 obtains the plurality of images transmitted from each of the cameras 8. The defect detection PC 22 performs surface defect detection processing by using these images.

Figure 5:
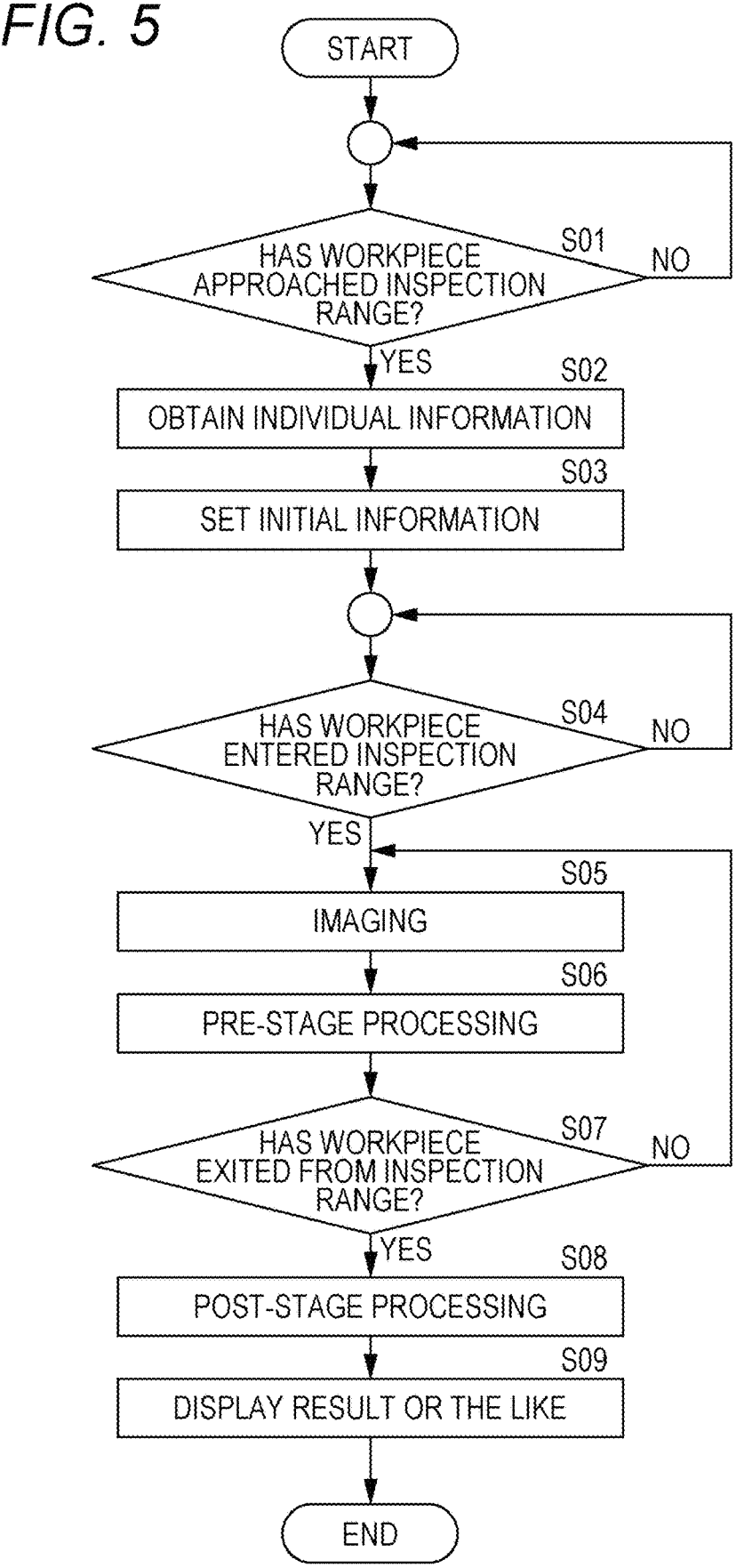
FIG. 5 is a flowchart illustrating processing performed by the entirety of the workpiece surface inspection system.

The entire processing performed by the workpiece surface inspection system is illustrated in the flowchart of FIG. 5.

In step S01, the master PC 21 determines whether the workpiece 1 has approached an inspection range, on the basis of a signal of the first position sensor 11, and if the workpiece 1 has not approached the inspection range (NO in step S01), the processing remains in step S01. If the workpiece 1 has approached the inspection range (YES in step S01), in step S02, the master PC 21 obtains individual information, such as an ID, a vehicle model, color, or a destination, of a vehicle body serving as a target of inspection, on the basis of a signal from the vehicle model information sensing sensor 12, and in step S03, the master PC 21 performs, for example, setting of a parameter of the inspection system, setting of an inspection range on the vehicle body, or the like as initial information setting.

In step S04, the master PC determines whether the workpiece 1 has entered the inspection range, on the basis of a signal of the second position sensor 13, and if the workpiece 1 has not entered the inspection range (NO in step S04), the processing remains in step S04. If the workpiece 1 has entered the inspection range (YES in step S04), in step S05, the camera 8 images the moving workpiece 1 in time series in a state where imaging ranges mostly overlap each other. Next, in step S06, pre-stage processing of surface defect detection processing performed by the defect detection PC 22 is performed. The pre-stage processing will be described below.

In step S07, it is determined whether the workpiece 1 has exited from the inspection range on the basis of a signal of the third position sensor 15. If the workpiece 1 has not exited (NO in step S07), the processing returns to step S05, and imaging and the pre-stage processing are continued. If the workpiece 1 has exited from the inspection range (YES in step S07), in step S08, post-stage processing of the surface defect detection processing performed by the defect detection PC 22 is performed. Stated another way, in this embodiment, the post-stage processing is performed after the entire processing of imaging the workpiece 1 has been finished. The post-stage processing will be described below.

After the post-stage processing, in step S09, a result of surface defect detection processing is displayed on the display 25 or the like.

Next, surface defect detection processing performed by the defect detection PC 22, including the pre-stage processing of step S06 and the post-stage processing of step S08 is described in detail.

[1] First Surface Defect Detection Processing

As described above, the defect detection PC 22 obtains, from each of the cameras 8, a plurality of images in which a position of a portion to be measured in the workpiece 1 continuously shifts in a direction of movement. This state is illustrated in FIG. 6. In FIG. 6A, images that have been continuously obtained from a signal camera 8 in time series are denoted by A11 to A17. A bright-and-dark pattern that is indicated in an image and in which a bright band (a white portion) and a dark band (a black portion) that extend in a vertical direction are alternately present in a lateral direction corresponds to the bright-and-dark striped pattern of illumination light of the illumination unit 6.

The tentative defect candidate extraction unit 222 of the defect detection PC 22 extracts a tentative defect candidate from each of the images. The tentative defect candidate is extracted by performing processing such as removal of a background or binarization. In this example, it is assumed that a tentative defect candidate 30 has been extracted from all of the images A11 to A17.

Next, the coordinate estimation unit 223 computes representative coordinates serving as a position of the tentative defect candidate 30, for the extracted tentative defect candidate 30 in each of the images, and determines a predetermined region around the representative coordinates as a tentative defect candidate region. Further, which coordinates the computed representative coordinates of the tentative defect candidate will move to is computed for the images A12 to A17 that follow, on the basis of an amount of movement or the like of the workpiece 1, and estimated coordinates in each of the images are obtained. For example, which coordinates the tentative defect candidate 30 extracted from the image A11 will move to is computed for the images A12 to A17 that follow, and estimated coordinates in each of the images are obtained.

Sates where estimated coordinates 40 of the tentative defect candidate 30 have been estimated in the images A12 to A17 that follow the image A11 are illustrated as respective images B12 to B17 in FIG. 6B. Note that the images B12 to B17 are the same as images obtained by removing the tentative defect candidate 30 from the images A12 to A17. In FIG. 6B, some images between the images B12 to B17 are omitted. In addition, a bright-and-dark pattern in an image is also omitted.

Next, the defect candidate determination unit 224 matches corresponding images with each other in such a way that from among the images A12 to A17 that follow the image A11 in FIG. 6A and the respective images B12 to B17 of FIG. 6B in which the estimated coordinates 40 of the tentative defect candidate 30 have been obtained, the image A12 is matched with the image B12, the image A13 is matched with the image B13, . . . , the image A17 is matched with the image B17. In matching, it is determined whether the estimated coordinates 40 correspond to an actual tentative defect candidate 30 in a corresponding image. Specifically, matching is performed by determining whether the estimated coordinates 40 are included in a predetermined tentative defect candidate region for an actual tentative defect candidate 30 in a corresponding image. Note that it may be determined whether the estimated coordinates 40 correspond to an actual tentative defect candidate 30 in a corresponding image, by determining whether the tentative defect candidate 30 is present within a predetermined range that has been set in advance on the basis of the estimated coordinates 40, or by determining whether estimated coordinates 40 in a corresponding image are present within a predetermined range that has been set in advance on the basis of representative coordinates of the tentative defect candidate 30. In a case where the estimated coordinates 40 correspond to a tentative defect candidate 30 in a corresponding image, it can be considered that a tentative defect candidate 30 included in an original image A11 is the same as a tentative defect candidate 30 included in an image that follows.

Next, the number of images in which the estimated coordinates 40 correspond to (matches) an actual tentative defect candidate 30 in a corresponding image as a result of matching is obtained, and it is determined whether the obtained number is greater than or equal to a threshold that has been set in advance. In a case where the obtained number is greater than or equal to the threshold, there is a high probability that the tentative defect candidate 30 will actually be present, and therefore the tentative defect candidate 30 in each of the images is determined as a defect candidate. In the examples of FIGS. 6A and 6B, matching has been performed in all of the images A12 to A17 that follow the image A11. Stated another way, estimated coordinates 40 are included in a tentative defect candidate region for a tentative defect candidate 30 in a corresponding image. In a case where the number of images in which estimated coordinates 40 correspond to an actual tentative defect candidate 30 is not greater than or equal to the threshold that has been set in advance, it can be considered that there is not a high probability that the tentative defect candidate 30 will be a defect candidate, and therefore matching is stopped, and the next tentative defect candidate 30 is extracted.

Next, the image group generation unit 225 cuts out, as an estimated region, a predetermined region around representative coordinates for a defect candidate, as surrounded with a rectangular frame line in the respective images A11 to A17 of FIG. 6A, from all of the images including the defect candidate, and generates an estimated region image group including a plurality of estimated region images C11 to C17, as illustrated in FIG. 6C. Note that the estimated region may be cut out from some of the images including the defect candidate, rather than all of the images including the defect candidate. However, as the number of images increases, an amount of information increases, and an increase in the number of images is desirable in that surface inspection can be performed with high accuracy. In addition, the estimated region may be determined by first obtaining an estimated region of the original image A11 and calculating a position of the estimated region in each of the images on the basis of an amount of movement of the workpiece 1.

The image composition unit 226 superimposes and combines the respective estimated region images C11 to C17 of the estimated region image group generated as described above, and generates a single composite image 51 illustrated in FIG. 6C. Superimposition is performed by using center coordinates of the respective estimated region images C11 to C17 as a reference. An example of the composite image 51 is at least any of an image, such as a standard deviation image, that has been obtained by calculating a statistical dispersion value and performing composition, a phase image, a phase difference image, a maximum value image, a minimum value image, and a mean value image. The composite image, such as a standard deviation image, obtained by calculating a statistical dispersion value will be described below.

Next, the defect detection unit 227 detects a surface defect by using the generated composite image 51. A standard of surface defect detection may be freely selected. For example, as illustrated by the signal graph 61 of FIG. 6C, only the presence/absence of a defect may be detected by identifying the presence of a defect in a case where a signal has a value that is greater than or equal to a reference value. Alternatively, a comparison with a reference defect or the like is made, and the type of a defect may be identified. Note that a standard of determination of the presence/absence of a defect or the type of a defect may be changed according to machine learning or the like, or a new standard may be generated.

A result of detecting a surface defect is displayed on the display 25. It is desirable that a developed view of the workpiece (the vehicle body) 1 be displayed on the display 25, and a position and a type of a surface defect be clearly displayed on the developed view.

As described above, in this embodiment, a plurality of estimated region images C11 to C17 that has been cut out from a plurality of images A11 to A17 including a defect candidate is combined into a single composite image 51, and a defect is detected on the basis of this composite image 51. Therefore, the composite image 51 includes information relating to a plurality of images Thus, a defect can be detected by using a large amount of information relating to a single defect candidate. Therefore, even a small surface defect can be stably detected with high accuracy while over-detection and erroneous detection are avoided.

In addition, in a case where the number of images in which estimated coordinates 40 correspond to an actual tentative defect candidate 30 in a corresponding image is greater than or equal to a threshold that has been set in advance, a composite image is generated, and a defect is detected. Therefore, a defect can be detected in a case where there is a high probability of the presence of a defect, and this results in a decrease in a processing load, improvements in the efficiency of detection, and improvements in the accuracy of detection.

Moreover, a plurality of conversion processes that is different from each other does not need to be performed on a fused image

[1-1] Variation 1 of Generation of Composite Image

Meanwhile, in some cases, accuracy does not increase by only superimposing and combining a plurality of estimated region images C11 to C17 by using center coordinates of respective images as a reference.

Figure 7:
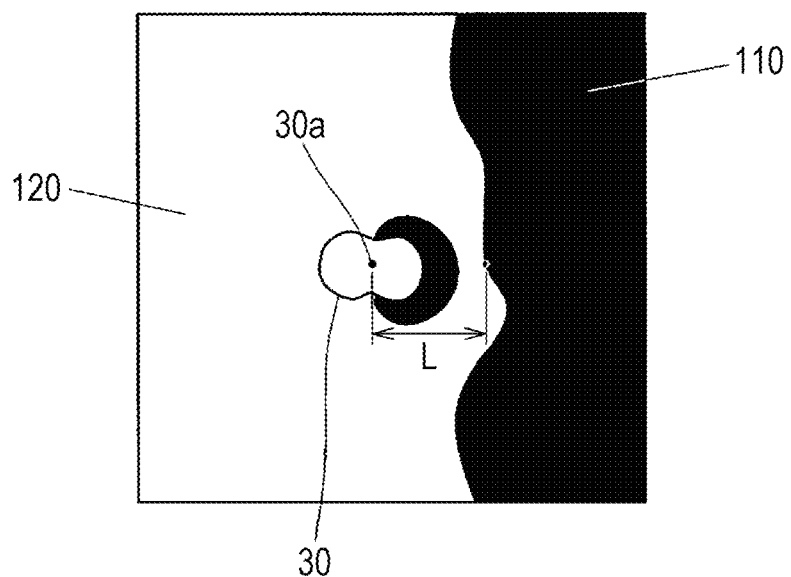
FIG. 7 is a diagram for explaining processing for correcting center coordinates of an estimated region image according to a position of a defect candidate from a boundary between a bright band part and a dark band part in an image.

Accordingly, it is desirable that the center coordinates of the respective estimated region images C11 to C17 be corrected, and superimposition be performed. As an example, center coordinates are corrected on the basis of a relative position in a bright-and-dark pattern in each of the images Specifically, in a case where a defect is present in the center of a bright band part or a dark band part of the bright-and-dark pattern, a symmetric shape is easily obtained. However, as illustrated in FIG. 7 by using an estimated image C14 as an example, in a position close to a boundary part with a dark band part 110 in a bright band part 120, a side of the boundary part of a defect candidate 30 becomes dark. In contrast, in a position close to the boundary part in the dark band part 110, a side of the boundary part becomes bright. Therefore, for example, if a position of the center of gravity is computed, a deviation from a center position 30a of the defect candidate 30 is generated. A deviating position has a correlation with a position from a boundary, and therefore center coordinates of an image are corrected according to a position L from the boundary.

FIG. 6D is a diagram illustrating a state where respective estimated region images C11 to C17 for which a center position has been corrected are superimposed and combined by using the center position as a reference, and a composite image 52 is generated. A sharp composite image 52 is obtained in comparison with the composite image 51 and the signal graph 61 of FIG. 6C, and the height of a signal also increases in a signal graph 62. Therefore, a composite image 52 having high accuracy can be generated, and this enables a surface defect to be detected with high accuracy.

[1-2] Variation 2 of Generation of Composite Image

Another composite image generation method in a case where accuracy does not increase by only superimposing and combining a plurality of estimated region images C11 to C17 by using center coordinates of respective images as a reference is described with reference to FIG. 8.

The same processing is performed until generation of the estimated region images C11 to C17 of FIG. 6C. In this example, an attempt is made to align the estimated region images C11 to C17 by using a plurality of combinations obtained by shifting center coordinates of respective images in at least one of a leftward/rightward direction (an x-direction) and an upward/downward direction (a y-direction) by various amounts of alignment. Then, from among the plurality of combinations, a combination having a maximum evaluation value is employed. In FIG. 8, superimposition is performed by using four types of combinations (A) to (D). Obtained composite images are respectively denoted by 53 to 56, and signal graphs based on the composite images are denoted by 63 to 66. In the example of FIG. 8, (B) that has gained a highest signal is employed.

As described above, in generating a composite image, a plurality of estimated region images C11 to C17 is aligned in such a way that an evaluation value reaches a maximum from among a plurality of combinations obtained by shifting center coordinates of respective images in at least one of an X-coordinate direction and a Y-coordinate direction. Therefore, a composite image having further higher accuracy can be generated, and this results in surface defect detection with high accuracy.

[1-3] Example of Tentative Defect Candidate Extraction Processing

An example of processing performed by the tentative defect candidate extraction unit 222 for extracting a tentative defect candidate having a large size and a gradual change in curvature is described.

First, returning to the principle of the present method using illumination having a bright-and-dark striped pattern, description is provided.

Illumination light is reflected on a surface of the workpiece 1, and enters each pixel of the camera 8. In other words, light incident on each of the pixels is light from a region where a line of sight from each of the pixels has been reflected on the surface of the workpiece 1 and has arrived, within a range that each of the pixels stares at. Without illumination, a dark pixel signal is obtained, and with illumination, a bright pixel signal is obtained. If the workpiece 1 has no defects, and is flat, a region on illumination that corresponds to each of the pixels approximates a point. In a case where there is a defect, a change in the surface of the workpiece 1 is of two types, (1) a change in curvature and (2) an inclination of a plane.

(1) As illustrated in FIG. 9A, when the surface of the workpiece 1 has a change in curvature due to the tentative defect candidate 30, a direction of a line of sight changes, and moreover, a region that each of the pixels stares at increases. As a result, a region that corresponds to each of the pixels becomes a larger region rather than a point, and an average luminance within the region corresponds to a pixel signal. Stated another way, in a case where a shape of the tentative defect candidate 30 suddenly changes, a change in curvature becomes larger within a region that each of the pixels stares at, and an increase in area, in addition to an inclination of a line of sight, cannot be ignored. An increase in the region that each of the pixels stares at results in averaging of an illumination distribution of a signal. If a region increases in illumination having a bright-and-dark striped pattern (in FIG. 9, an outlined portion is bright, and a portion that is colored black is dark), average values of both bright and dark regions according to a manner of an increase in the region are obtained. In a case where a bright-and-dark striped pattern of a portion where this phenomenon occurs sequentially moves, an influence of this movement is indicated in a standard deviation image.

(2) As illustrated in FIG. 9B, if due to the tentative defect candidate 30, a surface of the workpiece 1 has a large radius of curvature, and is inclined in a roughly planer shape, a corresponding region is still a point, but faces a direction that is different from a direction of a face that is not inclined. In a case where the tentative defect candidate 30 is large (a change in a shape is gradual), it is predominant that a region that each of the pixels stares at has no change and a direction of a line of sight changes, and a change in curvature is gradual. A standard deviation image does not indicate the change described above. In the case of a large defect, a difference in the inclination of a plane between a defect-free part and a defect part can be detected by using a phase image. In the case of the defect-free part, in the phase image, a phase in a direction parallel to stripes have no change, and a phase in a direction perpendicular to the stripes has a certain change according to a period of the stripes. In the case of the defect part, in the phase image, the regularity described above of the phase is disturbed. For example, by viewing phase images in an x-direction and a y-direction, a tentative defect candidate having a gradual change in curvature can be detected.

Both a small tentative defect candidate and a large tentative defect candidate can be extracted in two types of routines, a routine for the small tentative defect candidate and a routine for the large tentative defect candidate. It is sufficient if a candidate extracted in any of the routines is determined to be a tentative defect candidate.

Meanwhile, it is assumed that a size of a detected tentative defect candidate 30 is desired to be reported as a result. A correlation between a size of a defect in visual observation and a size of a defect detected from an image is obtained on the basis of an approximate circle of a portion where the inclination of a plane of a defect surface has a predetermined angle. In a case where a defect has a small size, a fixed linear relationship is established, but in the case of a defect having a large size and a gradual plane inclination, a non-linear relationship is established. Thus, a gradual tentative defect candidate 30 that has been detected in the phase image does not have a linear relationship between a defect signal and a defect size, and therefore correction needs to be performed by using a separately obtained calibration curve.

[1-4] Detection of Filiform Grain Defect

As an example of defect detection performed by the defect detection unit 227, processing for detecting filiform grains is described.

A filiform grain is a defect in which a filiform foreign matter has been confined below a coating material, and is not circular but is long and narrow. Some filiform grains have a small size in a line width direction (for example, less than 0.2 mm), but has a large size in a longitudinal direction (for example, 5 mm or more). Filiform grains are very narrow in a width direction and are small, and have a gradual change in curvature in the longitudinal direction. In some cases, filiform grains are overlooked by only using detection methods for small defects and for large defects (defects having a gradual inclination) that are similar to methods for extracting a tentative defect candidate. After predetermined processing, binarization and granulation are performed, and the presence/absence of a defect is determined on the basis of the area of each portion.

Filiform grains are narrow but long, and therefore, a predetermined area is obtained in appropriate detection. However, filiform grains are easy to detect in a case where a longitudinal direction is parallel to a direction in which the bright-and-dark pattern extends, but are difficult to detect in a case where the longitudinal direction is perpendicular to the direction in which the bright-and-dark pattern extends. A defective part is generated in the longitudinal direction, and it is likely that a defect is detected to be shorter than an actual defect, and stated another way, a granulated area is detected to be smaller than an actual area.

Accordingly, in a case where a certain degree of extension in the longitudinal direction is detected on the basis of information relating to a shape of a defect that has been obtained from the phase image, that is, in a case where circularity is lower than a predetermined value, a threshold of area determination is decreased, and therefore the not-yet-detection of filiform grains is avoided.

[1-5] Flowcharts

Figure 10:
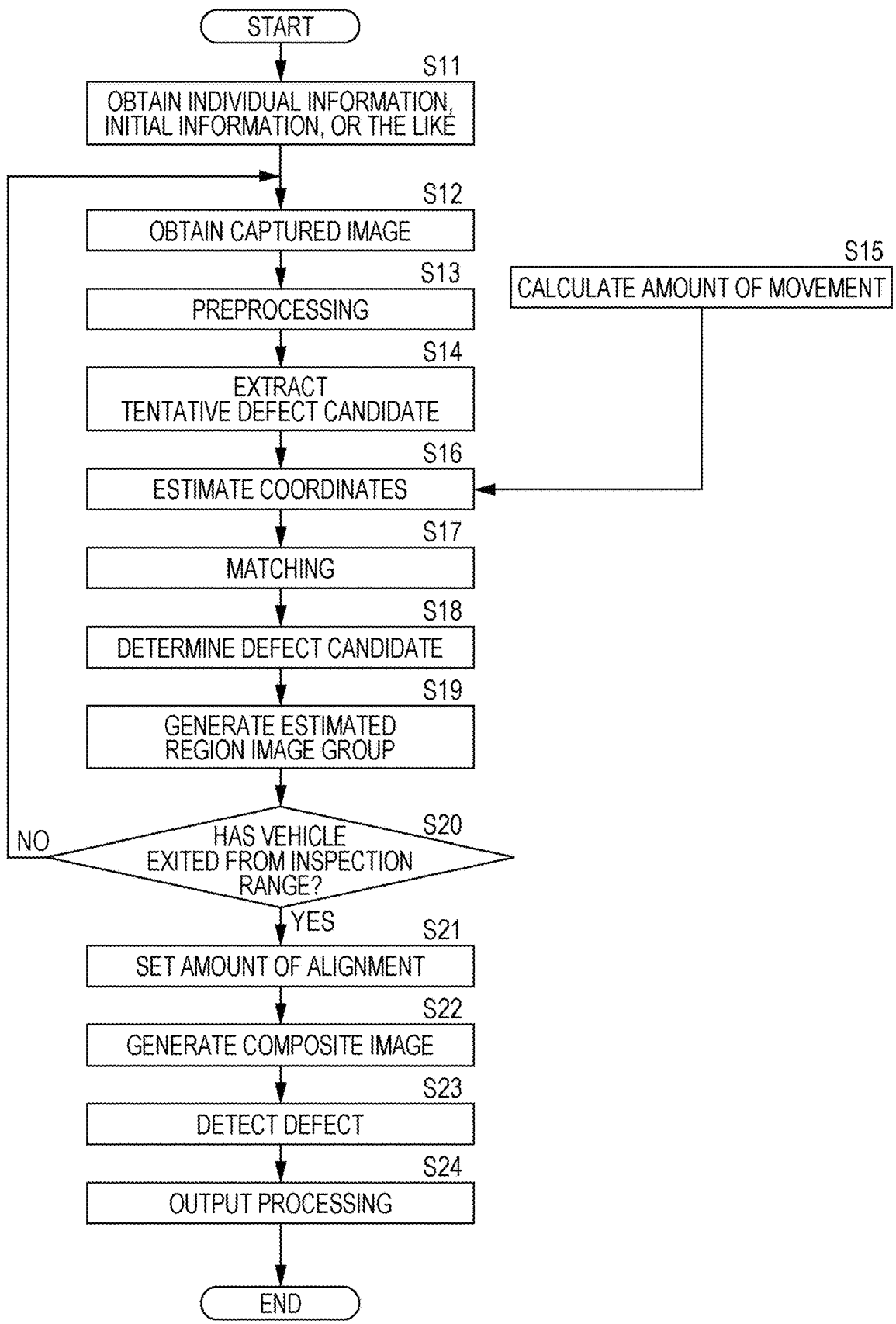
FIG. 10 is a flowchart illustrating the content of first surface defect detection processing performed by a defect detection PC.

FIG. 10 is a flowchart illustrating the content of surface defect detection processing performed by the defect detection PC 22. This surface defect detection processing indicates the content of the pre-stage processing of step S06 and the post-stage processing of step S08 in FIG. 5 in more detail. In addition, the processor in the defect detection PC 22 operates according to an operation program stored in an incorporated storage device such as a hard disk device, and therefore this surface defect detection processing is performed.

In step S11, individual information obtained by the master PC 21 in step S02 of FIG. 5, and initial information set in step S03, such as setting of a parameter or setting of an inspection range on a vehicle body, are obtained from the master PC 21.

Next, in step S12, an image captured by the camera 8 is obtained, and in step S13, preprocessing, such as setting of positional information for an image on the basis of the initial information or the like, is performed.

Next, in step S14, a tentative defect candidate 30 is extracted from each of the images, and in step S15, an amount of movement of the workpiece 1 is calculated for one tentative defect candidate 30. Therefore, in step S16, coordinates of the tentative defect candidate 30 are estimated in images that follow, and estimated coordinates 40 are determined.

In step S17, matching is performed. Stated another way, it is determined whether the estimated coordinates 40 are present in a predetermined tentative defect candidate region for an actual tentative defect candidate 30 in a corresponding image. In a case where the number of images on which matching has been performed is greater than or equal to a threshold that has been set in advance, in step S18, a tentative defect candidate 30 of each of the images is determined as a defect candidate.

In step S19, a predetermined region around representative coordinates of the defect candidate is extracted as an estimated region from all of the images having a defect candidate, an estimated region image group including a plurality of estimated region images C11 to C17 is generated, and the processing proceeds to step S20. Steps S12 to S19 correspond to pre-stage processing.

In step S20, it is determined whether a vehicle body serving as the workpiece 1 has exited from the inspection range on the basis of information obtained from the master PC 21. If the vehicle body has not exited from the inspection range (NO in step S20), the processing returns to step S12, and an image continues to be obtained from the camera 8. If the vehicle body has exited from the inspection range (YES in step S20), in step S21, an amount of alignment is set for each of the estimated region images C11 to C17. Then, in step S22, the respective estimated region images C11 to C17 are combined to generate a composite image, and in step S23, defect detection processing is performed. Steps S21 to S23 correspond to post-stage processing. After defect detection, in step S24, a result of detection is output to the display 25 or the like.

The matching processing of step S17 is described in detail with reference to the flowchart of FIG. 11.

In step S201, a variable k of the number of images that match the tentative defect candidate 30 is set to zero, and in step S202, a variable N of the number of images serving as a target of determination as to matching the tentative defect candidate 30 is set to zero.

In step S203, the tentative defect candidate 30 is extracted, and in step S204, N+1 is set in N. Next, in step S205, it is determined whether the tentative defect candidate 30 matches the estimated coordinates 40. If the tentative defect candidate 30 matches the estimated coordinates 40 (YES in step S205), in step S206, K+1 is set in K, and the processing proceeds to step S207. In step S205, if the tentative defect candidate 30 does not match the estimated coordinates 40 (NO in step S205), the processing proceeds to step S207.

In step S207, it is checked whether N has reached a predetermined number of images (here, seven). If N has not reached the predetermined number (NO in step S207), the processing returns to S203, and the tentative defect candidate 30 is extracted from the next image. In a case where N has reached the predetermined number (YES in step S207), in step S208, it is determined whether K is greater than or equal to a predetermined threshold that has been set in advance (here, five). If K is not greater than or equal to the threshold (NO in step S208), the processing returns to step S201. Accordingly, in this case, processing for cutting out an estimated region image or image composition processing that follows is not performed, N and K are reset, and the next tentative defect candidate 30 is extracted.

If K is greater than or equal to the threshold (YES in step S208), in step S209, the tentative defect candidate 30 is determined as a defect candidate, and information relating to this determination is stored. Then, in step S210, an estimated region image is cut out from K matching images. Then, in step S211, K estimated region images that have been cut out are combined, and in step S212, it is determined whether a surface defect has been detected. If the surface defect has been detected (YES in step S212), in step S213, the surface defect is confirmed, and information relating to this confirmation is stored, and the processing proceeds to step S214. In a case where the surface defect has not been detected (NO in step S212), the processing proceeds to step S214 in this state.

In step S214, it is checked whether detection processing has been performed on all of the portions to be inspected in a workpiece. If detection processing has not been performed on all of the portions to be inspected (NO in step S214), the processing returns to step S201, N and K are reset, and the next tentative defect candidate 30 is extracted. If detection processing has been performed on all of the portions to be inspected (YES in step S214), the processing is terminated.

As described above, in this embodiment, in a case where the number K of images in which the tentative defect candidate 30 corresponds to (matches) the estimated coordinates 40 is not greater than or equal to a threshold, the number of matching images is small, and there is not a high probability that the tentative defect candidate 30 will be a defect candidate, and therefore processing that follows is canceled. If the number of matching images is greater than or equal to K, there is a high probability that the tentative defect candidate 30 will be a defect candidate, and therefore cutting out of an estimated region image, image composition, and defect detection are performed. Thus, a processing load is decreased, the efficiency of detection is improved, and the accuracy of detection is improved in comparison with a case where cutting out of an estimated region image, image composition, and defect detection are performed regardless of the number of matching images.

Figure 12:
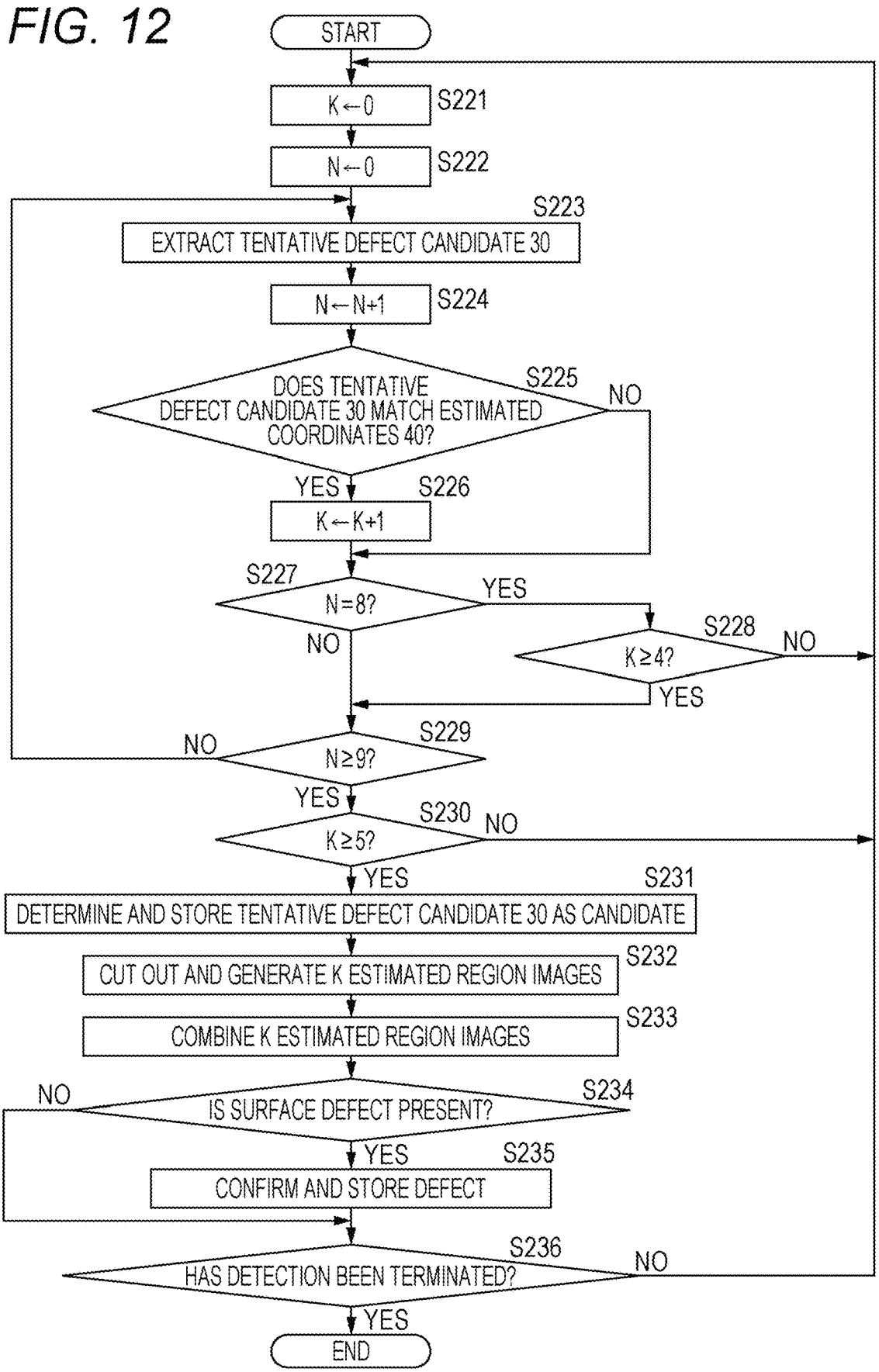
FIG. 12 is a flowchart for explaining a variation of the matching processing of step S17 in FIG. 10.

FIG. 12 is a flowchart for explaining a variation of the matching processing of step S17 in FIG. 10. In this example, in a case where the number K of matching images has not reached a fixed value before the number N of images has reached a fixed value, it is determined that there is not a high probability that the tentative defect candidate 30 will be a defect candidate, and at the point in time, processing that follows is canceled.

In step S221, a variable K of the number of images that match the tentative defect candidate 30 is set to zero, and in step S222, a variable N of the number of images serving as a target of determination as to matching the tentative defect candidate 30 is set to zero.

In step S223, the tentative defect candidate 30 is extracted, and in step S224, N+1 is set in N. Next, in step S225, it is determined whether the tentative defect candidate 30 matches the estimated coordinates 40. If the tentative defect candidate 30 matches the estimated coordinates 40 (YES in step S225), in step S226, K+1 is set in K, and the processing proceeds to step S227. In step S225, if the tentative defect candidate 30 does not match the estimated coordinates 40 (NO in step S225), the processing proceeds to step S227.

In step S227, it is checked whether N has reached a second predetermined number of images (here, eight). If N has reached the second predetermined number (YES in step S227), in step S228, it is checked whether K has reached a second threshold that has been set in advance (here, four). If K has not reached the second threshold (NO in step S228), the processing returns to step S221. Accordingly, in this case, processing for cutting out an estimated region image or image composition processing that follows is not performed, N and K are reset, and the next tentative defect candidate 30 is extracted.

In step S228, if K has reached the second threshold (YES in step S228), the processing proceeds to step S229. In step S227, in a case where N has not reached the second predetermined number of images (eight) (NO in step S227), similarly, the processing proceeds to step S229.

In step S229, it is checked whether N has reached a first predetermined number (here, nine). If N has not reached the first predetermined number (NO in step S229), the processing returns to S223, and the tentative defect candidate 30 is extracted from the next image. In a case where N has reached the first predetermined number (YES in step S229), in step S230, it is determined whether K is greater than or equal to a first threshold that has been set in advance (here, five). If N is not greater than or equal to the first threshold (NO in step S230), the processing returns to step S201. Accordingly, in this case, processing for cutting out an estimated region image or image composition processing that follows is not performed, N and K are reset, and the next tentative defect candidate 30 is extracted.

If K is greater than or equal to the first threshold (YES in step S230), in step S231, the tentative defect candidate 30 is determined as a defect candidate, and information relating to this determination is stored, and in step S232, an estimated region image is cut out from K matching images. Then, in step S233, K estimated region images that have been cut out are combined, and in step S234, it is determined whether a surface defect has been detected. If the surface defect has been detected (YES in step S234), in step S235, the surface defect is confirmed, and information relating to this confirmation is stored, and the processing proceeds to step S236. In a case where the surface defect has not been detected (NO in step S234), the processing proceeds to step S236 in this state.

In step S236, it is checked whether detection processing has been performed on all of the portions to be inspected in a workpiece. If detection processing has not been performed on all of the portions to be inspected (NO in step S236), the processing returns to step S201, N and K are reset, and the next tentative defect candidate 30 is extracted. If detection processing has been performed on all of the portions to be inspected (YES in step S236), the processing is terminated.

Figure 11:
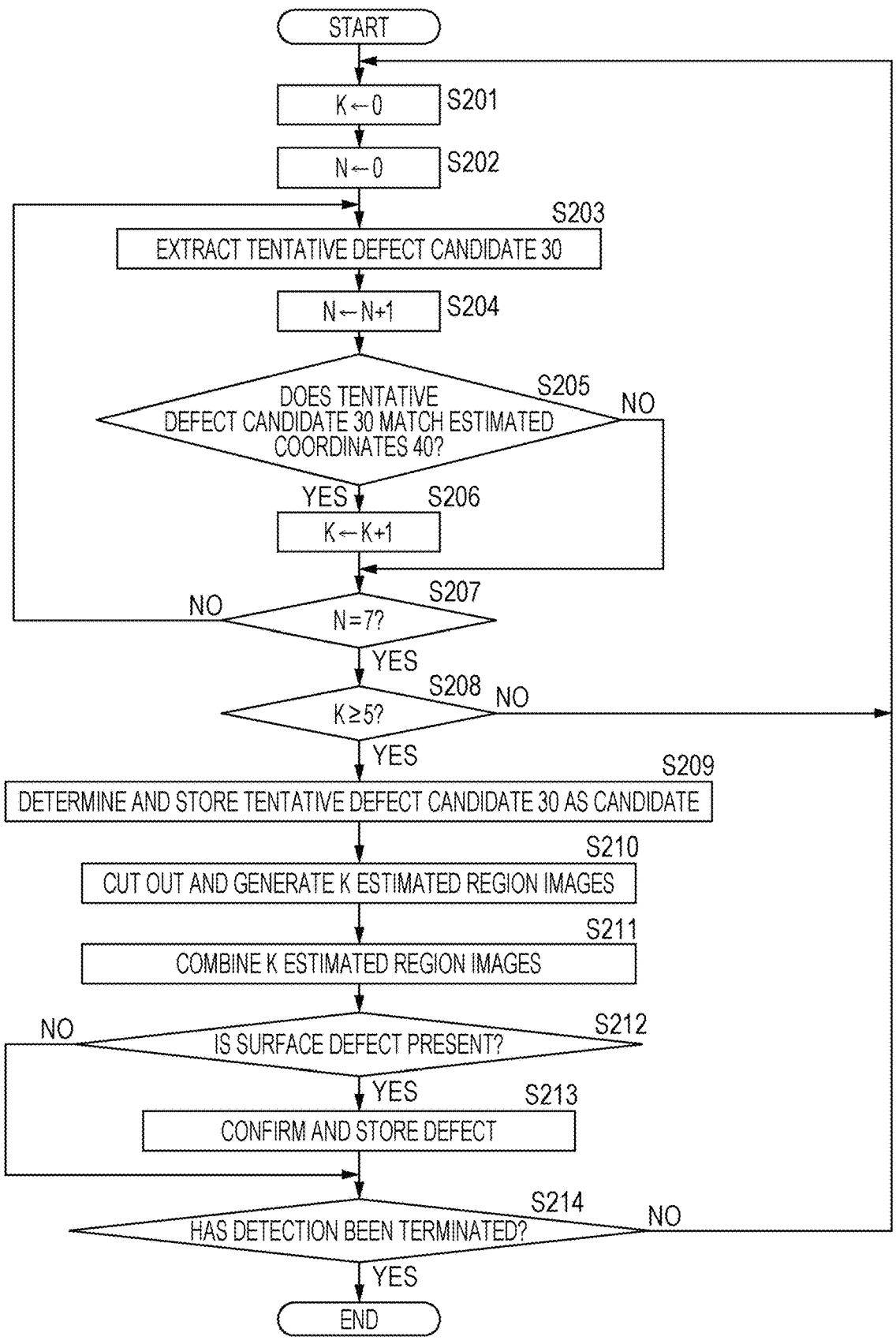
FIG. 11 is a flowchart for explaining the matching processing of step S17 in FIG. 10 in more detail.

As described above, in this embodiment, the same effect as an effect of the embodiment illustrated in the flowchart of FIG. 11 is exhibited, and following effects are also exhibited. Specifically, in a stage where the number N of images from which the tentative defect candidate 30 has been extracted is a first set value that is smaller than a second set value, that is, in an intermediate stage, if the number K of images in which the tentative defect candidate 30 corresponds to (matches) the estimated coordinates 40 has not reached a first threshold that is smaller than a second threshold, it is determined that the number of matching images is small and there is not a high probability that the tentative defect candidate 30 will be a defect candidate, and processing that follows is canceled without continuing matching processing until a final image. Thus, useless processing is not continued, and therefore a processing load can be further reduced, and the accuracy of detection can be further improved.

Figure 13:
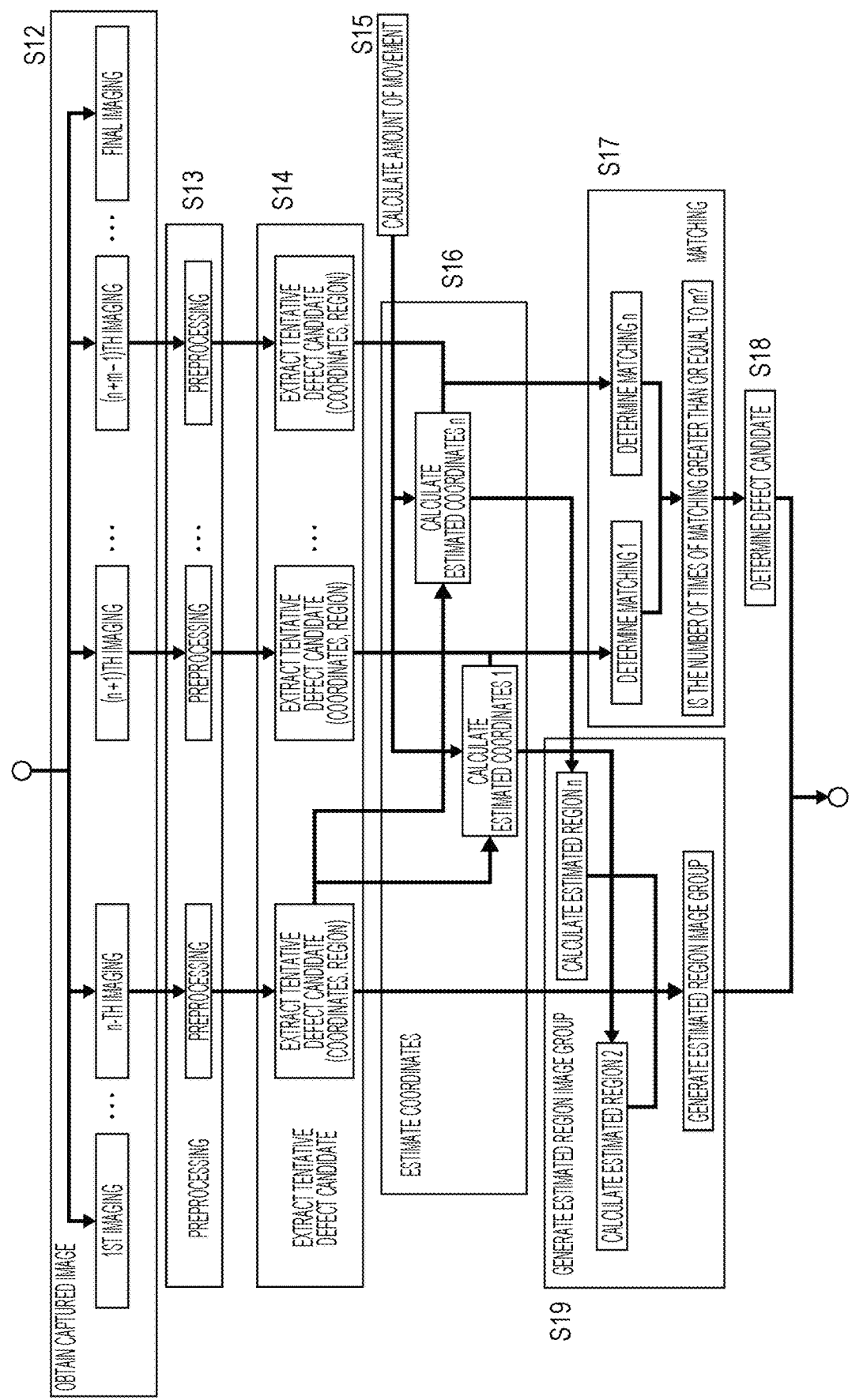
FIG. 13 is a flowchart illustrating details of steps S12 to S18 in the flowchart of FIG. 10.

FIG. 13 is a flowchart illustrating details of steps S12 to S18 of the flowchart of FIG. 10 that serve as pre-stage processing of surface defect detection processing, and the same processes as processes in the flowchart of FIG. 10 are denoted by the same step numbers.

After one workpiece 1 enters an inspection range and before the one workpiece 1 exits from the inspection range, the workpiece 1 is continuously imaged by the camera 8 while the workpiece 1 is being moved, and in step S12, the defect detection PC 22 obtains an image in first imaging to an image in final imaging. Here, it is assumed that images obtained by imaging a single tentative defect candidate 30 are an image in n-th imaging to an image in (n+m−1)th imaging.

In step S13, preprocessing is performed on each of the images, and in step S14, the tentative defect candidate 30 is extracted from each of the image in n-th imaging to the image in (n+m−1)th imaging, and representative coordinates and a tentative defect candidate region of the extracted tentative defect candidate 30 are obtained. Next, in step S16, which coordinates the representative coordinates of the tentative defect candidate will move to is computed for each of images that follow, on the basis of the calculation of an amount of movement of the workpiece 1 in step S15, or the like, and estimated coordinates 40 in each of the images are obtained.

In step S17, matching is performed on each of the images that follow. In a case where the number of matching images is greater than or equal to a threshold (for example, m), in step S18, the tentative defect candidate 30 is determined as a defect candidate. In step S19, an estimated region is calculated for each of the images, and an estimated region image group including a plurality of estimated region images C11 to C17 is generated.

[2] Second Surface Defect Detection Processing

In the first surface defect detection processing described above, the defect detection PC 22 has extracted the tentative defect candidate 30 from images that have been continuously obtained in time series from the camera 8.

A method for extracting the tentative defect candidate 30 is not limited, but it is desirable that a configuration in which the processing described below is performed to extract the tentative defect candidate 30 be employed in that a defect portion is emphasized and the tentative defect candidate 30 can be extracted with higher accuracy.

Specifically, binarization is performed on each of the images A11 to A17 (illustrated in FIG. 6) that have been obtained from the camera 8, and then a threshold is applied. Alternatively, a corner detection function is applied, and therefore a feature point of an image is extracted. Then, the tentative defect candidate 30 may be extracted by obtaining a multidimensional feature point for each of the extracted feature points.

It is more desirable that each of the images obtained from the camera 8 be binarized before extraction of a feature point, a contour be extracted, an image obtained by performing expansion and contraction a predetermined number of times be subtracted, and an orange peel mask that removes a boundary part between a bright band and a dark band be generated. It is desirable that a feature point be extracted from each of the images obtained by applying the generated mask to mask the boundary part between the bright band and the dark band, and this enables a tentative defect candidate to be extracted with higher accuracy.

In addition, the tentative defect candidate 30 may be extracted by extracting feature points of images and obtaining a multidimensional feature point for each of the extracted feature points with respect to all of the pixels within a surrounding specified range on the basis of luminance gradient information in all of the vertical, horizontal, and oblique directions from all of the pixels.

After the extraction of the tentative defect candidates 30, processing that is similar to the first surface defect detection processing described above is performed to generate an estimated region image group including a plurality of estimated region images C11 to C17, and then a defect is detected for each of the tentative defect candidates by using the estimated region image group.

As described above, in the second surface defect detection processing, a feature point of an image is extracted from a plurality of images that has been obtained from the camera 8 and in which a position of a portion to be measured in a workpiece 1 has continuously shifted, and a multidimensional feature amount is obtained for each of the extracted feature points, and therefore the tentative defect candidate 30 is extracted. Thus, the tentative defect candidate 30 can be extracted with high accuracy, and this enables a surface defect to be detected with high accuracy.

Moreover, coordinates of the extracted tentative defect candidate 30 are obtained, which coordinates the coordinates of the tentative defect candidate 30 will move to is computed for each of the plurality of images that follows an image from which the tentative defect candidate 30 has been extracted in such a way that estimated coordinates 40 are obtained, and it is determined whether the estimated coordinates 40 correspond to the tentative defect candidate 30 in a corresponding image. If among the images that follow, the number of images in which the estimated coordinates 40 correspond to the tentative defect candidate is greater than or equal to a threshold that has been set in advance, the tentative defect candidate 30 is determined as a defect candidate. Then, for each of the determined defect candidates, a predetermined region around the defect candidate is cut out as an estimated region from a plurality of images including the defect candidate, an estimated region image groups including a plurality of estimated region images C11 to C17 is generated, and a defect is identified on the basis of the generated estimated region image group.

Stated another way, the plurality of estimated region images C11 to C17 including the defect candidate includes plural pieces of information relating to a single defect candidate, and therefore a defect can be detected by using a larger amount of information. Thus, even a small surface defect can be stably detected with high accuracy while over-detection and erroneous detection are avoided.

[2-1] Flowcharts

Figure 14:
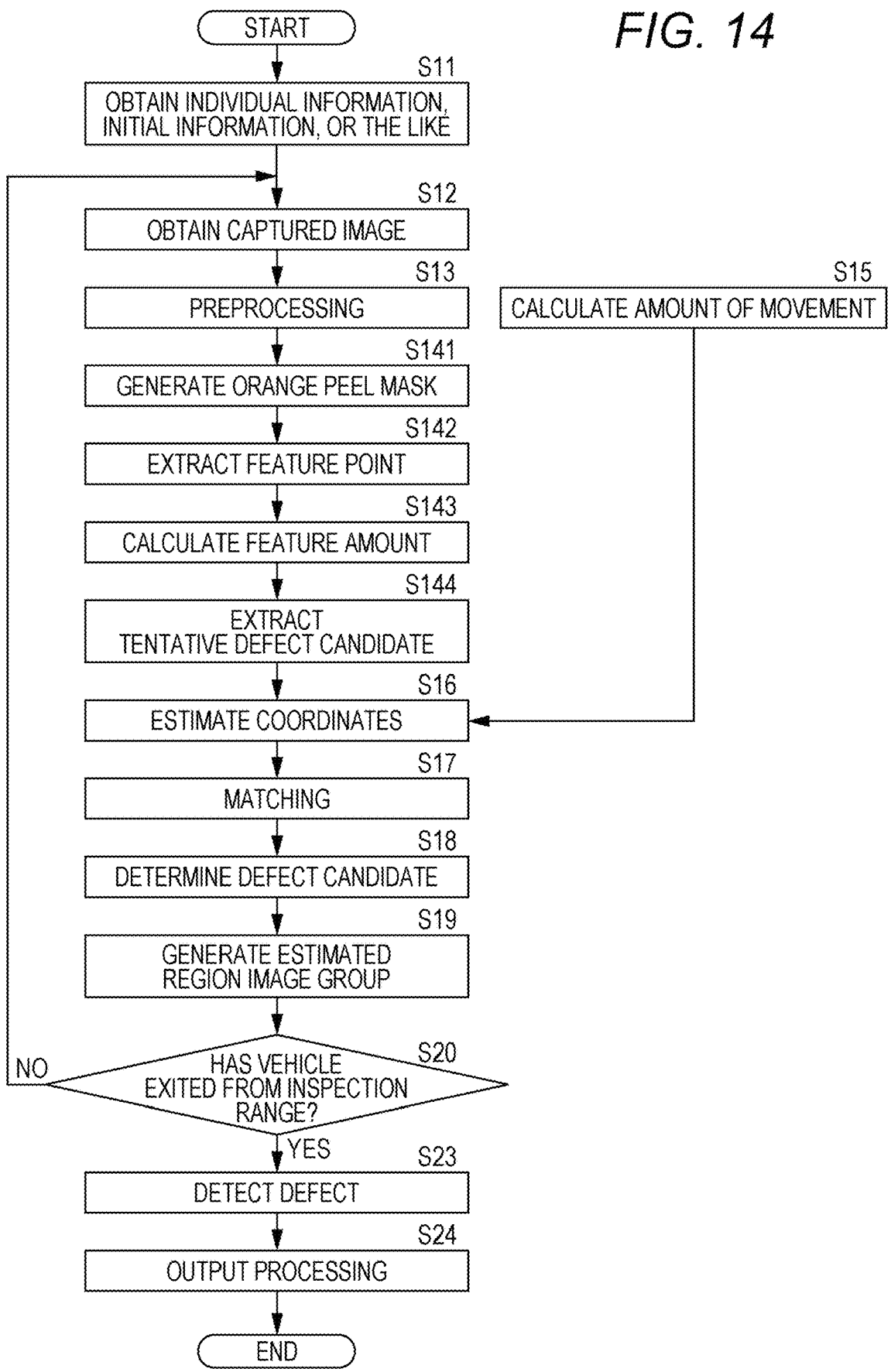
FIG. 14 is a flowchart illustrating second surface defect detection processing performed by the defect detection PC.

FIG. 14 is a flowchart illustrating second surface defect detection processing performed by the defect detection PC. Note that steps S11 to S13 and steps S15 to S20 are the same as steps S11 to S13 and steps S15 to S20 in FIG. 10, and therefore the same step numbers are used, and description is omitted.

After the preprocessing of step S13, in step S141, an orange peel mask is generated, and in step S142, the generated orange peel mask is applied, and a feature point is extracted.

Next, in step S143, a multidimensional feature amount is calculated for each of the extracted feature points, in step S144, the tentative defect candidate 30 is extracted, and the processing proceeds to step S16.

In step S20, in a case where a vehicle body serving as the workpiece 1 has exited from an inspection range (YES in step S20), in step S23, defect identification processing is performed by using the generated estimated region image group, and in step S24, a result of identification is displayed.

Figure 15:
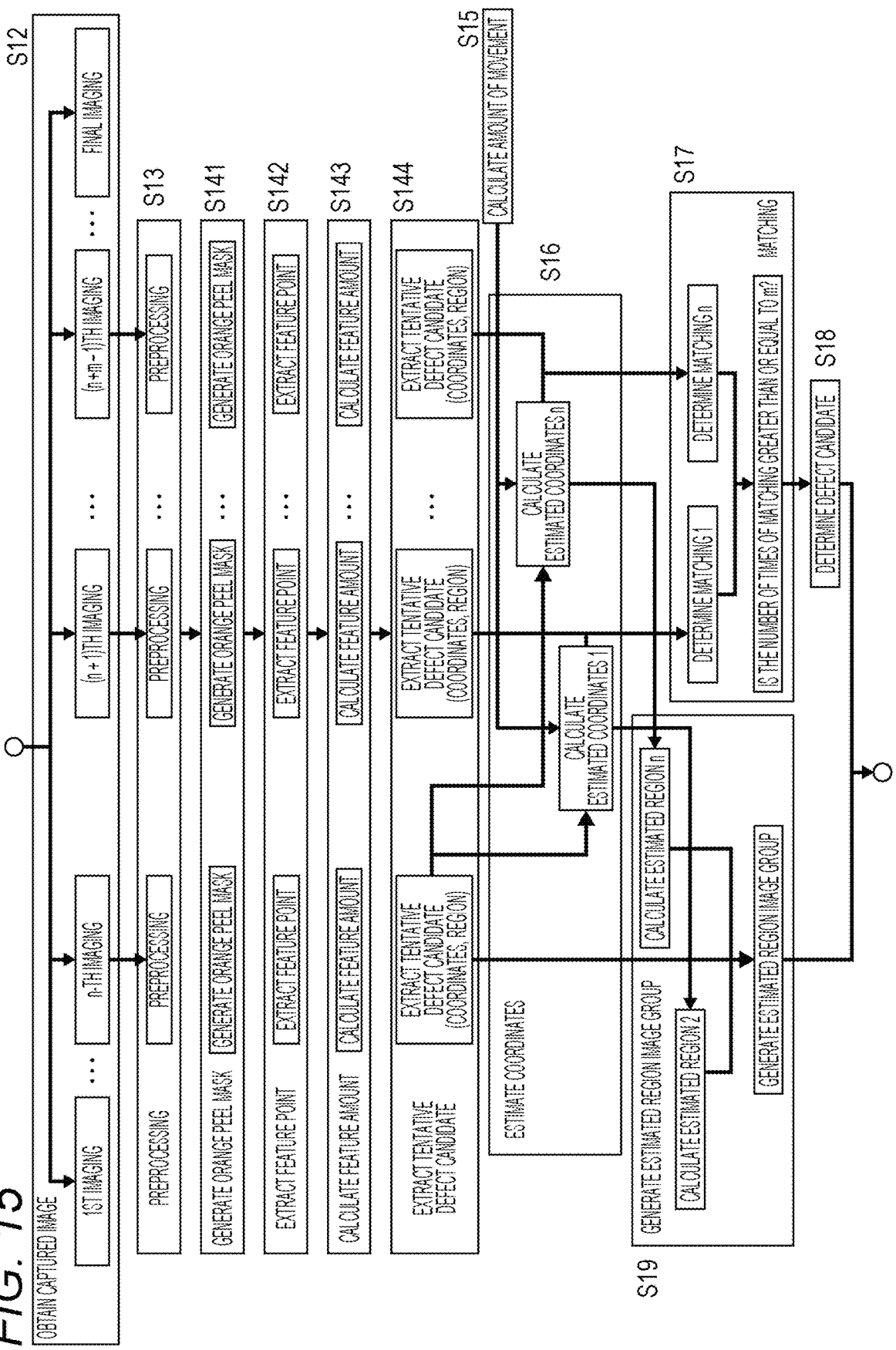
FIG. 15 is a flowchart illustrating details of steps S12 to S18 in the flowchart of FIG. 14.

FIG. 15 is a flowchart illustrating details of steps S12 to S18 of the flowchart of FIG. 14, and the same processes as processes in the flowchart of FIG. 14 are denoted by the same step numbers. Note that steps S12, S13, and S15 to S19 are the same as the processes of steps S12, S13, and S15 to S19 in FIG. 13, and therefore description is omitted.

After the preprocessing of step S13, in step S141, an orange peel mask is generated for each of the images. In step S142, the generated orange peel mask is applied to each of the images, and a feature point of each of the images is extracted.

In step S143, a multidimensional feature amount is calculated for each of the extracted feature points of each of the images, in step S144, a tentative defect candidate is extracted for each of the images, and the processing proceeds to step S16.

[3] Third Surface Defect Detection Processing

In the first surface defect detection processing described above, the tentative defect candidate 30 has been extracted from each of the images A11 to A17, a defect candidate has been determined, an estimated region around the defect candidate has been calculated, a plurality of estimated region images C11 to C17 has been combined, and a defect has been detected.

In contrast, in third surface defect detection processing, each of a plurality of images that has been obtained from the camera 8 and is continuous in time series is divided into a plurality of regions, corresponding regions in previous and subsequent images are combined, and then a defect is detected. However, the workpiece 1 is moving. Therefore, an imaging range of the workpiece 1 that is indicated by a region in the previous image is not the same as an imaging range of the workpiece 1 that is indicated by a region in the subsequent image, and an imaging position changes according to an amount of movement of the workpiece 1. Thus, a position of the region in the subsequent image that corresponds to the region in the previous image is shifted by a position shifting amount that corresponds to the amount of movement of the workpiece 1, and composition is performed. In addition, an amount of displacement of the region in the subsequent image that corresponds to the region in the previous image changes according to a position of a divided region. Therefore, the position shifting amount that corresponds to the amount of movement of the workpiece 1 is set for each of the divided regions.

Details are described below, but a plurality of images that has been continuously captured by the camera 8 and has been continuously obtained in time series by the defect detection PC 22 is the same as images that have been obtained in the first surface defect detection processing.

Figure 16:
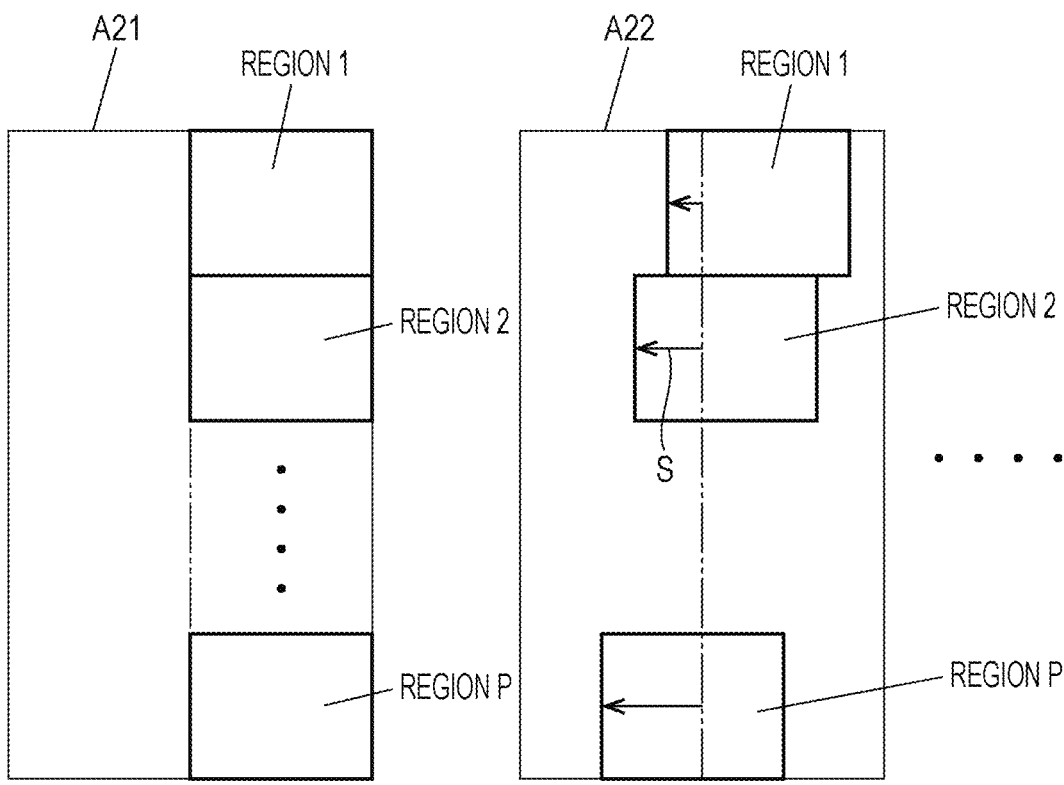
FIG. 16 is a diagram for explaining third surface defect detection processing, and is a diagram illustrating a plurality of images (in this example, two images) that has been continuously obtained in time series.

FIG. 16 illustrates a plurality of images A21 and A22 that has been continuously obtained in time series. In this example, two images are illustrated, but in practice, the number of images is larger. Note that in the images A21 and A22, a bright-and-dark pattern in each of the images is omitted. Each of these images A21 and A22 is divided in a direction (in FIG. 16, an upward/downward direction) that is orthogonal to a direction of movement of a workpiece to obtain a plurality of regions 1 to p. Each of the regions 1 to p has the same position and the same size in the images A21 and A22.

The workpiece is moving. Therefore, an imaging range that corresponds to an image in each of the regions 1 to p, for example, in the image A21 obtained from the camera 8 is displaced in a direction of movement by an amount of movement of the workpiece 1 relative to each of the original regions 1 to p, as illustrated as an arrow in the next image A22 that follows. Accordingly, a position of each of the regions 1 to p in the image A22 is shifted by a position shifting amount S that corresponds to the amount of movement of the workpiece. Therefore, each of the regions 1 to p in the image A21 and each of the regions 1 to p after position shifting in the image A22 indicate the same imaging range on the workpiece 1. Such a relationship is established in each of the regions 1 to p between previous and subsequent captured images. Thus, regions 1 to p in each of the images that follow are sequentially shifted by a position shifting amount S, and therefore an imaging range for each of the regions 1 to p can be made uniform in the original image A21 and each of the images that follow.

However, as schematically illustrated in the image A22 of FIG. 16, amounts of displacement of regions 1 to p relative to original regions 1 to p are different from each other. For example, in a case where an imaging range of a single camera 8 includes a straight line part and a curved part of the workpiece 1, in an image, an amount of displacement of a region that corresponds to the straight line part is not the same as an amount of displacement of a region that corresponds to the curved part. In addition, an amount of displacement changes according to closeness relative to the camera 8. Therefore, even if all of the regions 1 to p are shifted by a uniform position shifting amount, the same imaging range is not indicated in all of the regions.

Accordingly, in this embodiment, a position shifting amount S is calculated and set for each of the regions 1 to p. Specifically, information relating an average magnification in a region is obtained for each of the regions 1 to p on the basis of camera information, camera positional information, a three-dimensional shape of a workpiece, and positional information of the workpiece. Then, the position shifting amount S is calculated for each of the regions 1 to p on the basis of the obtained magnification information and the approximate speed of movement that has been assumed in advance, and the position shifting amount S is determined for each of the regions 1 to p.

Here, calculation of the position shifting amount is additionally described. It is assumed that a moving workpiece 1 is imaged plural times at equal time intervals. A manner of movement of an identical point in two continuous captured images is focused on.

An amount of movement on an image has a relationship with an imaging magnification of a camera and the speed of a workpiece. The imaging magnification of the camera depends on (1) a focal length of a lens, and (2) a distance from the camera to each part of the workpiece. With respect to (2), an amount of movement is larger in a part that is close to the camera on an image than an amount of movement in a part that is far from the camera. If a three-dimensional shape of the workpiece 1, and moreover, an installation position of the camera 8 and a position and an orientation of the workpiece 1 are known, where a point of interest will be located in an image captured at a certain moment can be calculated.

Figure 17:
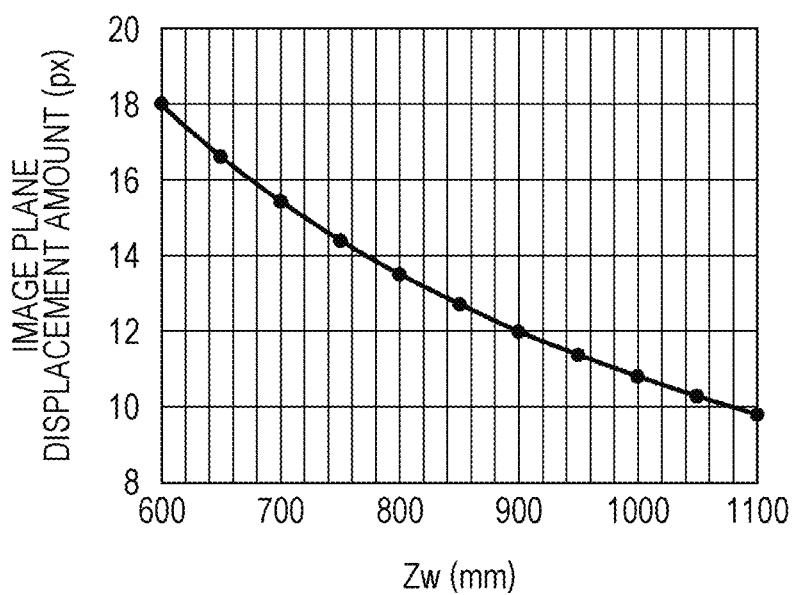
FIG. 17 is a graph illustrating an example of a relationship between a position of a workpiece (a vehicle body) and a displacement amount of an image plane.

In a case where the workpiece 1 has moved and a position has changed, how many pixels an identical point of interest will move by on two continuous images can be calculated. For example, it is assumed that a sensor having a focal length of 35 mm and a pixel size of 5.5 μm is used, and a workpiece moves by 1.7 mm in adjacent images. As illustrated in the graph of FIG. 17, a distance (Zw) to the workpiece 1 is 600 to 1100 mm, and therefore, a distance of movement in a screen is 18 pixels to 10 pixels.

If an alignment error required to generate a composite image is reduced to ±1 pixel, it is sufficient if a difference in distance is ±5 cm. A region is sectioned on an image in such a way that a difference in distance to the camera is within ±5 cm. An average amount of displacement of continuous images is calculated for each of the sectioned regions on the basis of the approximate speed of movement of the workpiece 1. Three types of amounts of displacement including the amount of displacement described above and amounts of displacement±1 pixel can be set for each of the regions 1 to p. However, the amount of displacement is not limited to three types, and the difference in distance is not limited to ±5 cm.

Note that the set position shifting amount S for each of the regions 1 to p is stored in a table in a storage unit within the defect detection PC 22 in association with each of the regions 1 to p, and the position shifting amount is called from the table and is set for imaging portions for which the same position shifting amount can be set, for example, parts having the same shape in the workpiece 1 or the same type of workpiece.

Next, in a state where a position of each of the regions 1 to p has been shifted by using the set position shifting amount S, a predetermined number of images that are continuous are combined for each of the regions 1 to p. In composition, images of each of the regions 1 to p are superimposed onto each other in a state where each of the regions has been shifted by using the set position shifting amount S, an arithmetic operation is performed for each of the pixels having corresponding coordinates, and a composite image is generated for each of the pixels. An example of the composite image is at least any of an image, such as a standard deviation image, that has been obtained by calculating a statistical dispersion value and performing composition, a phase image, a phase difference image, a maximum value image, a minimum value image, and a mean value image.

Next, preprocessing, such as removal of a background or binarization, is performed, for example, on a standard deviation image serving as the composite image, and a defect candidate is extracted. Then, a surface defect is detected by using an arithmetic operation or a composite image that is different from an arithmetic operation or a composite image in processing at the time of extraction of the defect candidate, as needed. A standard of detection of the surface defect may be freely selected. Only the presence/absence of a defect may be identified, or the type of a defect may be identified in comparison with a reference defect or the like. Note that it is sufficient if a standard of identification of the presence/absence of a defect or the type of a defect is set according to a characteristic of a workpiece and a defect, the standard may be changed according to machine learning or the like, or a new standard may be generated.

A result of detecting a surface defect is displayed on the display 25. It is desirable that a developed view of the workpiece (the vehicle body) be displayed on the display 25, and a position and a type of a surface defect be clearly displayed on the developed view.

As described above, in this embodiment, each of a plurality of captured images A21 and A22 that has been continuously obtained in time series from a camera is divided into a plurality of regions 1 to p, a plurality of images is combined for each of the divided regions 1 to p, and a defect is detected on the basis of this composite image. Therefore, the composite image includes information relating to a plurality of images. Thus, a defect can be detected by using a large amount of information relating to a single defect candidate. Therefore, even a small surface defect can be stably detected with high accuracy while over-detection and erroneous detection are avoided.

Moreover, images of corresponding regions are combined in a state where regions 1 to p in the subsequent image A22 have been sequentially shifted relative to regions 1 to p in the previous image A21 by a position shifting amount S that has been set according to an amount of movement of the workpiece 1. Therefore, a region in the previous image and a corresponding region in the subsequent image indicate the same imaging range of the workpiece 1, and a plurality of images can be combined in a state where an imaging range of the workpiece 1 is made uniform. In addition, the position shifting amount is set for each of the divided regions 1 to p. Therefore, an error of an imaging range can be reduced to a minimum in comparison with a case where a uniform position shifting amount is applied to all of the divided regions 1 to p. Therefore, a surface defect can be detected with higher accuracy.

[2-1] Variation 1 Relating to Position Shifting Amount

In the example described above, a position shifting amount S that corresponds to each of the divided regions 1 to p is calculated for each of the regions 1 to p on the basis of magnification information of each of the regions 1 to p and the approximate speed of movement that has been assumed in advance. However, the position shifting amount S may be set on the basis of a result of setting a plurality of position shifting amounts S for each of the regions 1 to p.

For example, a position shifting amount candidate is set for each of the regions 1 to p under a plurality of conditions from slow speed to high speed including the assumed speed of movement. Then, each of the position shifting amount candidates is applied, and respective composite images are generated. Moreover, a defect is detected as needed. These results are compared with each other, and a position shifting amount S that has gained the highest evaluation is employed.

As described above, a plurality of position shifting amount candidates is set for each of the regions 1 to p under conditions different from each other, a comparison is made between results of combining images by using the respective position shifting amount candidates, and a position shifting amount candidate that has gained the highest evaluation is employed as a position shifting amount S for each of the regions 1 to p. Therefore, a position shifting amount S that is suitable for each of the regions 1 to p can be set, and a surface defect can be detected with higher accuracy.

[2-2] Variation 2 Relating to Position Shifting Amount

The position shifting amount S for each of the regions 1 to p may be set as described below. Specifically, as illustrated in the graph of FIG. 17, if a distance of movement of the workpiece 1 in adjacent images is known, a position shifting amount on the images can be calculated. In the example described above, the position shifting amount is set on the basis of the assumed speed of movement of a workpiece.

An appropriate position shifting amount for each of the frames at the time of generating a composite image may be determined on the basis of an actually measured position of a workpiece. In this case, time and effort for selecting an optimal position shifting amount from a plurality of position shifting amounts is saved.

A method for measuring a position of a workpiece is described below. An identical portion of a workpiece 1 or a supporting member that moves in the same manner as the workpiece 1 is imaged by using a plurality of cameras dedicated to a position that is disposed in a direction of movement of the workpiece 1, and positional information the workpiece is obtained on the basis of the images First, if the workpiece 1 has a characteristic hole, the hole or a mark installed on a stand that holds and moves the workpiece 1 is used as a target of measuring a position or speed of the workpiece 1.

In order to detect the target, a plurality of cameras that is different from the cameras 8 is prepared. For example, the plurality of cameras is disposed in a line in an advancing direction of the workpiece 1 so as to stare at a side face of the workpiece from a side of the workpiece 1. The plurality of cameras is disposed so as to cover the entire length of the workpiece 1 when fields of view in a lateral direction of the plurality of cameras are connected to each other. Magnification can be calculated on the basis of a distance from a camera to the workpiece 1 and a focal length of the camera. An actual position is obtained on the basis of a position on an image according to the magnification. When a positional relationship among respective cameras is known, the position of the workpiece 1 is obtained on the basis of pieces of image information of the respective cameras.

Pieces of workpiece positional information that have been obtained from the plurality of cameras are associated with each other, and therefore an appropriate position shifting amount is obtained on the basis of images of the cameras 8 for extracting a defect. For example, an average amount of movement on an image in adjacent images that corresponds to an amount of movement of the workpiece 1 is determined for each of the regions that have been virtually divided on the workpiece 1 in such a way that a difference in distance on the workpiece when viewed from a camera is ±5 cm, and a composite image is generated by using the average amount of movement as a position shifting amount at the time of superimposition.

[2-3] Variation 3 Relating to Position Shifting Amount

In Variation 2, a position of a workpiece has been obtained by using a plurality of disposed cameras. In contrast, an identical portion of the workpiece 1 or a supporting member that moves in the same manner as the workpiece 1 may be measured by using a measurement system including any one of a distance sensor, a speed sensor, and a vibration sensor or a combination thereof, and workpiece positional information may be obtained.

A method for measuring a position of a workpiece is described. Part of the workpiece 1 or an identical portion of a supporting member that moves in the same manner as the workpiece 1 is used as a target. In detecting a position of a workpiece, "sensor that senses passage through a reference point of the position of the workpiece+distance sensor" or "sensor that senses passage through a reference point+speed sensor+imaging time interval in adjacent images" is used. In the former case, the position of the workpiece is directly obtained. In the latter case, the position of the workpiece at the time of capturing each of the images can be obtained by multiplying speed information from the speed sensor by an imaging interval.

Pieces of workpiece positional information are associated with each other, and therefore an appropriate position shifting amount is obtained on the basis of images of the cameras 8 for extracting a defect. For example, an average amount of movement on an image in adjacent images that corresponds to an amount of movement of the workpiece 1 is determined for each of the regions that have been virtually divided on the workpiece 1 in such a way that a difference in distance on the workpiece when viewed from a camera is ±5 cm, and a composite image is generated by using the average amount of movement as a position shifting amount at the time of superimposition.

[2-4] Flowcharts

The entire processing performed by the workpiece surface inspection system is performed according to the flowchart illustrated in FIG. 5.

Figure 18:
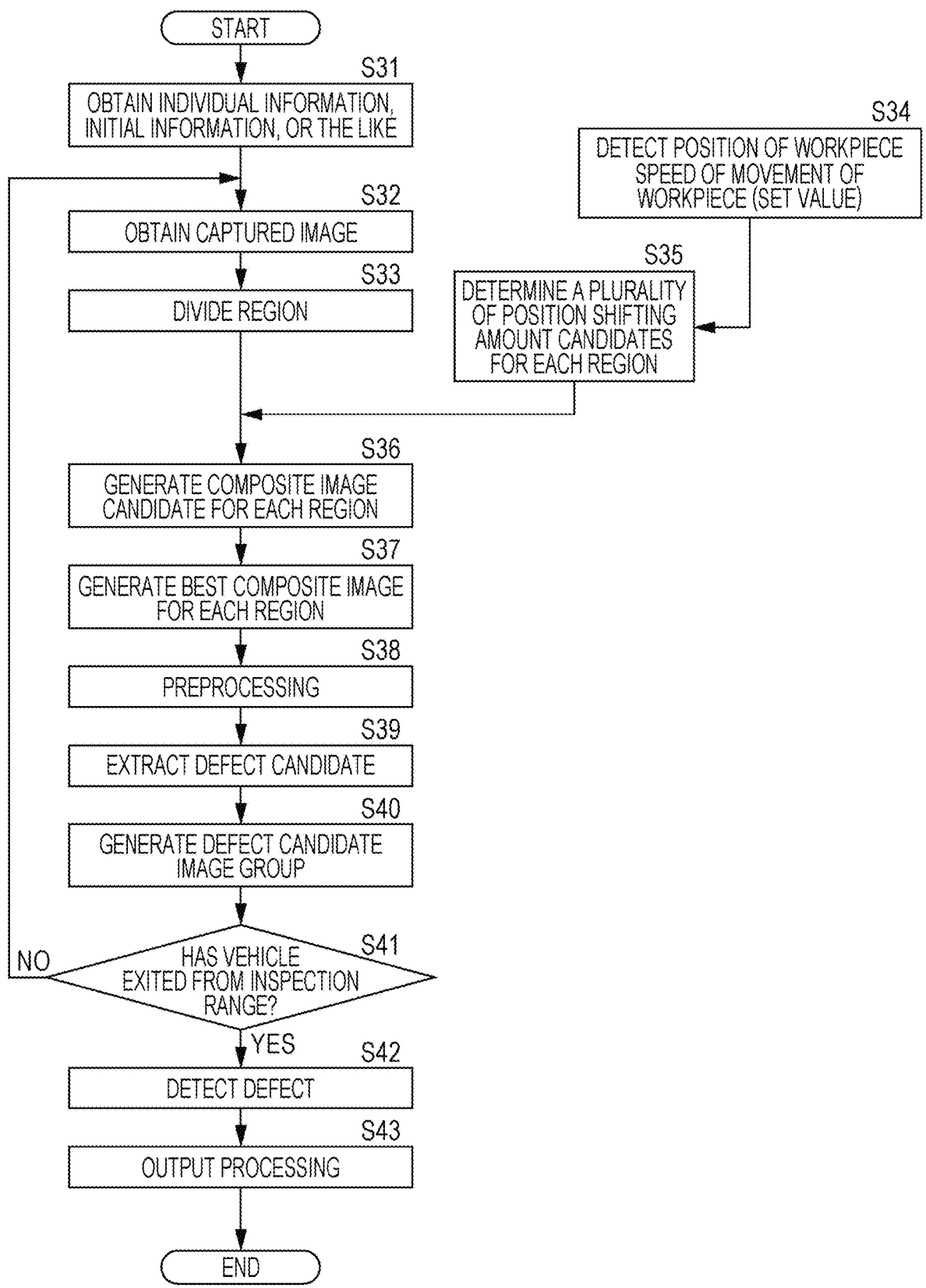
FIG. 18 is a flowchart illustrating the content of the third surface defect detection processing performed by the defect detection PC.

FIG. 18 is a flowchart illustrating the content of third surface defect detection processing performed by the defect detection PC 22. This surface defect detection processing indicates the content of the pre-stage processing of step S06 and the post-stage processing of step S08 in FIG. 5 in more detail. In addition, the processor in the defect detection PC 22 operates according to an operation program stored in an incorporated storage device such as a hard disk device, and therefore this surface defect detection processing is performed.

In step S31, individual information obtained by the master PC 21 in step S02 of FIG. 5, and initial information set in step S03, such as setting of a parameter or setting of an inspection range on a vehicle body, are obtained from the master PC 21.

Next, in step S32, images A21 and A22 captured by the camera 8 are obtained, and in step S33, each of the images A21 and A22 is divided into a plurality of regions 1 to p. On the other hand, in step S35, a plurality of position shifting amount candidates is set for each of the divided regions 1 to p on the basis of a position or the speed of movement of the workpiece 1 (step S34), or the like.

Next, in step S36, a plurality of images obtained by shifting a position by using the plurality of position shifting amount candidates is combined for a single region, and a plurality of composite image candidates is generated for each of the regions. Then, in step S37, a comparison is made between composite images for each of the generated position shifting amount candidates, a position shifting amount candidate that has gained the highest evaluation is determined as a position shifting amount for the regions 1 to p, and a plurality of images is combined again for each of the regions by using the position shifting amount, and a composite image is generated.

In step S38, preprocessing, such as the removal of a background or binarization, is performed on the composite image, and in step S39, a defect candidate is extracted. Such processing is performed on each of the plurality of regions 1 to p and each of a predetermined number of images. Therefore, in step S40, a large number of defect candidate image groups from which a defect candidate has been extracted are generated, and the processing proceeds to step S41. Steps S32 to S40 correspond to pre-stage processing.

In step S41, it is determined whether a vehicle body has exited from an inspection range on the basis of information obtained from the master PC 21. If the vehicle body has not exited from the inspection range (NO in step S41), the processing returns to step S32, and an image continues to be obtained from the camera 8. If the vehicle body has exited from the inspection range (YES in step S41), in step S42, defect detection processing is performed on the defect candidate image group. Step S42 corresponds to post-stage processing. After defect detection, in step S43, a result of detection is output to the display 25 or the like.

Figure 19:
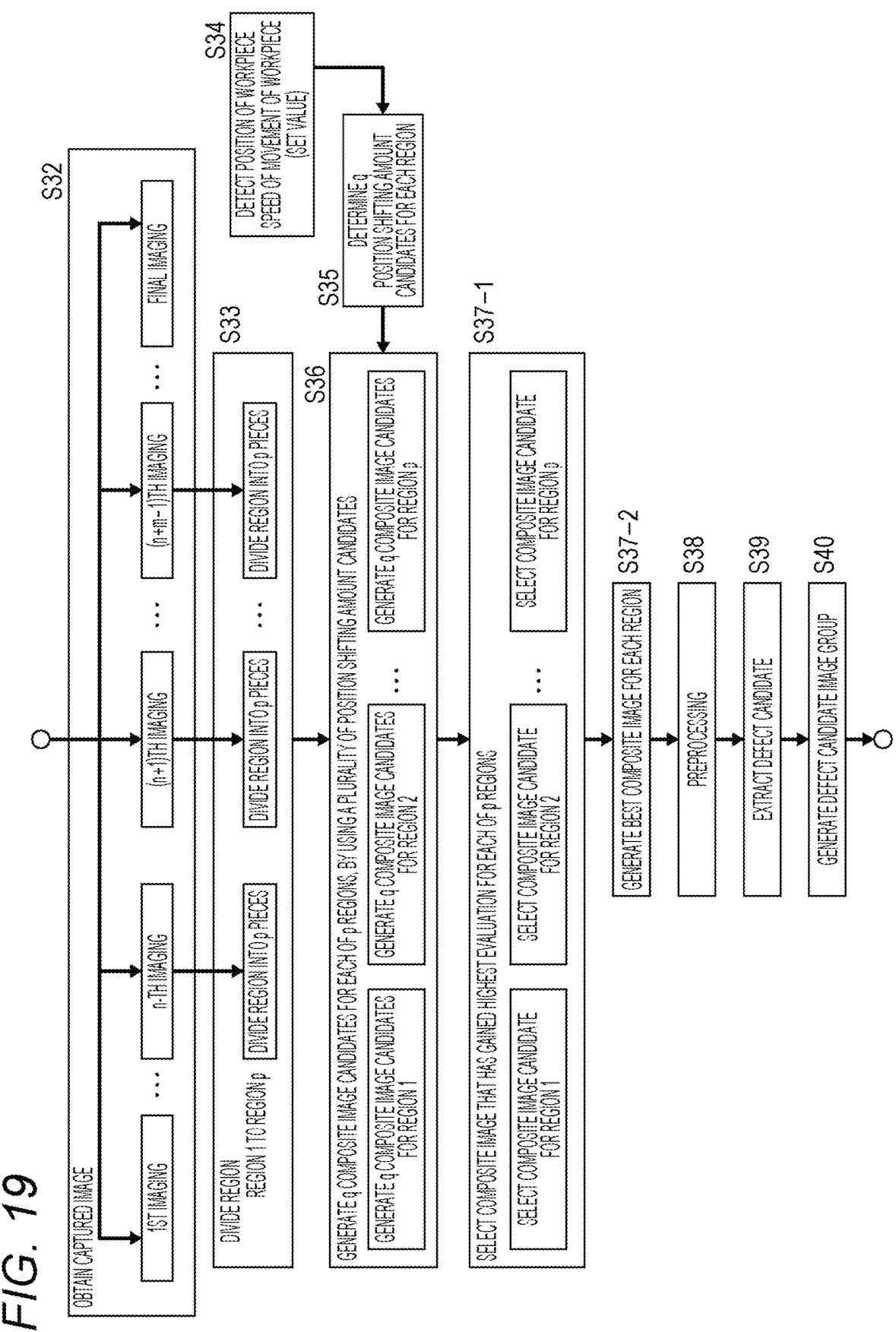
FIG. 19 is a flowchart illustrating details of steps S32 to S40 in the flowchart of FIG. 18.

FIG. 19 is a flowchart illustrating details of steps S32 to S40 of the flowchart of FIG. 18 that serve as pre-stage processing of surface defect detection processing, and the same processes as processes in the flowchart of FIG. 18 are denoted by the same step numbers.

After one workpiece 1 enters an inspection range and before the one workpiece 1 exits from the inspection range, imaging is continuously performed by the camera 8 while the workpiece 1 is being moved, and in step S32, the defect detection PC 22 obtains an image in first imaging to an image in final imaging. Here, a case where an image in n-th imaging to an image in (n+m−1)th imaging are used is described as an example.

In step S33, each of the images is divided, for example, into p image regions, regions 1 to p. In step S35, q position shifting amount candidates are set for each of the p regions. In step S36, the q position shifting amount candidates are applied to each of the p image regions, and q composite image candidates are generated. Stated another way, q composite images are generated for each of the regions 1 to p.

In step S37-1, a composite image having a largest evaluation value is selected for each of the region 1 to the region p, and the position shifting amount candidates that correspond to the selected composite image are determined as a position shifting amount for a corresponding image region.

Then, in step S37-2, the determined position shifting amount is applied to each of the regions 1 to p, and a composite image is generated.

Preprocessing (step S38), defect candidate extraction processing (step S39), and defect candidate image group generation processing (step S40) that follow are similar to preprocessing, defect candidate extraction processing, and defect candidate image group generation processing in FIG. 18, and description is omitted.

[4] Generation of Standard Deviation Image or the Like

In the first surface defect detection processing and the third surface defect detection processing, when a workpiece is moved in a state where a bright-and-dark illumination pattern is applied, a plurality of images to be combined is generated on the basis of a plurality of images that has been captured in time series by the camera 8, and indicates a duplicate imaging range, and the plurality of images is combined into a single image, and a composite image is formed. A conceivable example of this composite image is an image, such as a standard deviation image, that has been obtained by calculating a statistical dispersion value and performing composition.

The statistical dispersion value is at least any of variance, a standard deviation, and half width. Any of the above may be calculated, but a case where a standard deviation is calculated and composition is performed is described here.

Figure 20:
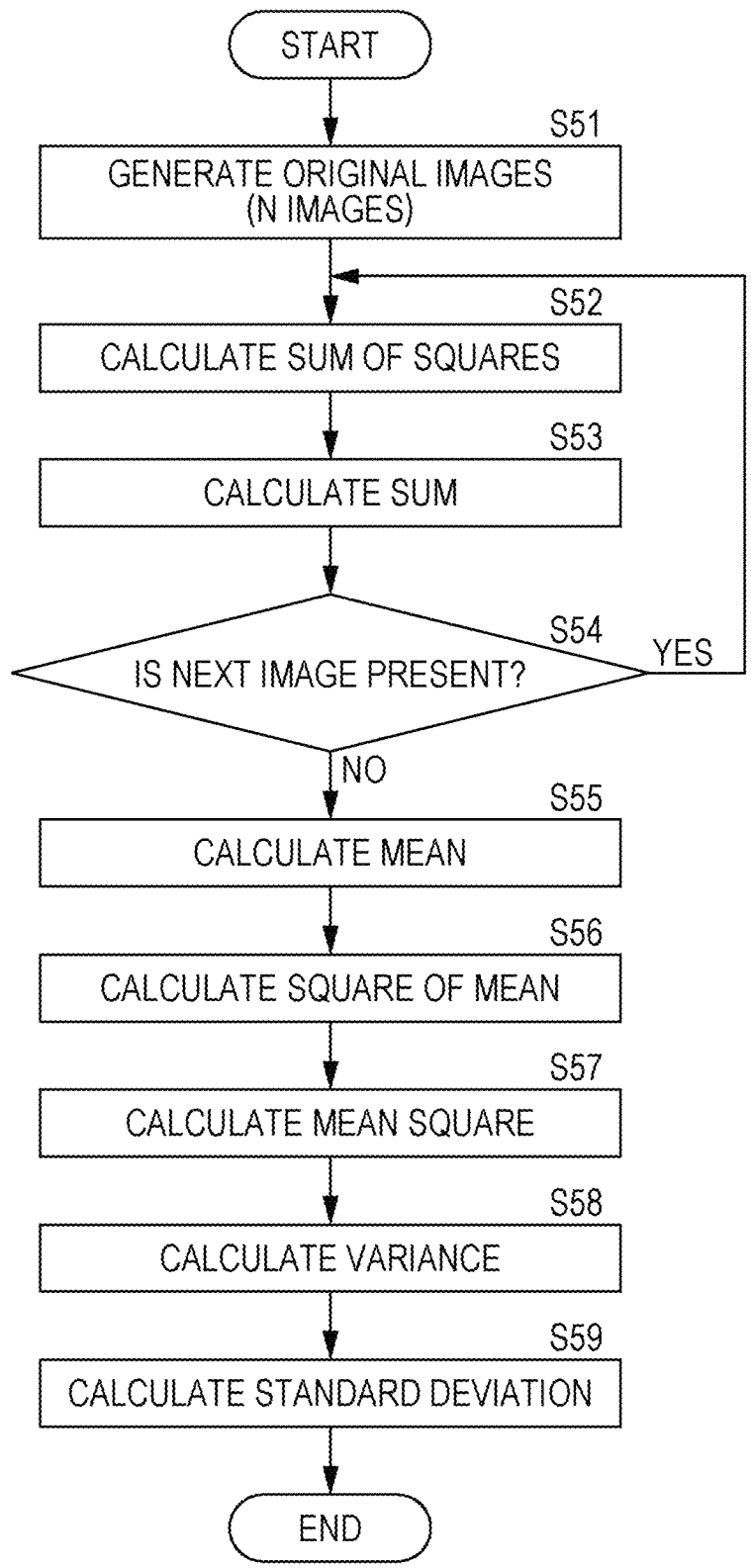
FIG. 20 is a flowchart illustrating standard deviation image generation processing.

A standard deviation is calculated for each corresponding pixel in a plurality of images. FIG. 17 is a flowchart illustrating standard deviation image generation processing. Note that a defect detection CPU operates according to an operation program stored in a storage unit or the like, and therefore processing illustrated in FIG. 20 and the flowcharts that follow is performed.

In step S51, original images (N images) to be combined are generated. In step S52, the sum of squares of a luminance value (hereinafter also referred to as a pixel value) is calculated for each pixel in a first original image, and in step S53, the sum of pixel values is calculated for each of the pixels. In calculating both the sum of squares and the sum for the first original image, a result of only the first original image is obtained.

Next, in step S54, whether the next image is present is checked. If the next image is present (YES in step S54), the processing returns to step S52, and a pixel value of each of the pixels in a second image is squared, and a result is added to a square value of each of the corresponding pixel values of the first image Next, in step S53, each of the pixel values of the second image is added to each of the corresponding pixel values of the first image.

Such processing is sequentially performed on the N images, and the sum of squares of respective pixel values and the sum of the respective pixel values are calculated for each of the corresponding pixels of the N images.

When the processing described above has been performed on the N images (NO in step S54), in step S55, a mean of the sums of the respective pixel values that have been calculated in step S53 is calculated, and in step S56, the square of the mean of the sums is calculated.

Next, in step S57, a mean square serving as a mean value of the sums of squares of the respective pixel values that have been calculated in step S52 is calculated, and in step S57, variance is obtained according to the formula {(mean square)−(square of mean)}. Then, in step S59, a standard deviation serving as the square root of variance is obtained.

It is desirable that the standard deviation obtained as described above be normalized, and a composite image is generated on the basis of the result. Note that it is sufficient if similar calculation is performed in a case where variance or half width is used as a statistical dispersion value.

Surface defect detection processing is performed on the basis of the generated composite image. It is sufficient if detection processing is performed similarly to the first surface defect detection processing or the third surface defect detection processing.

As described above, corresponding pixels in a plurality of images are combined by calculating a statistical dispersion value, and this is applied to all of the pixels to generate a composite image. Therefore, even if the number of images to be combined is small, a composite image having a high S/N ratio of defect detection can be generated. By using this composite image, a defect can be detected with high accuracy, an unnecessary defect candidate is prevented from being detected, and the overlooking of detection of a necessary defect can be avoided. In addition, a cost decreases in comparison with a case where a composite image is generated by using a maximum value, a minimum value, or the like.

[4-1] Another Embodiment 1 Relating to Standard Deviation Image

FIG. 21 illustrates a graph of illuminance at which the illumination unit 6 applies illumination having a bright-and-dark pattern to the workpiece 1. In the graph of FIG. 21, a top 71 of a waveform indicates a bright band, and a bottom 72 indicates a dark band.

Rising and falling parts 73 of the waveform from the bright band to the dark band or from the dark band to the bright band are not vertical in practice, but is inclined. In an image portion that corresponds to an intermediate point of each of the rising and falling parts 73, a pixel value is intermediate gradation, and affects dispersion.

Figure 21A:
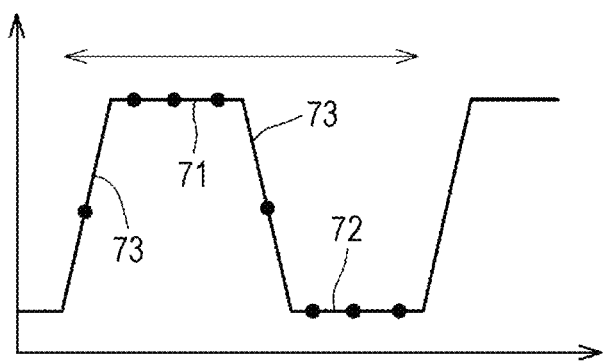
FIG. 21 is a diagram illustrating a graph of illuminance at which an illumination device applies illumination having a bright-and-dark pattern to a workpiece.
Figure 21B:
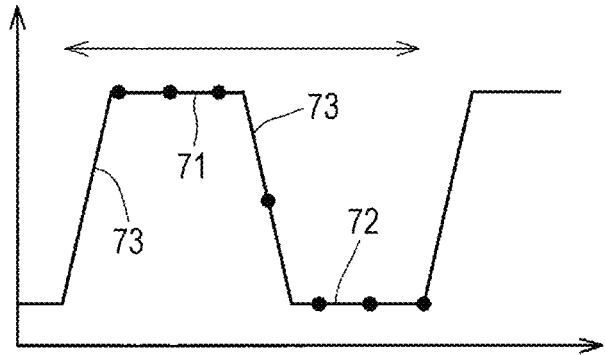

In a case where imaging has been performed plural times in one period of an illumination pattern, for example, when it is assumed that imaging has been performed eight times, as illustrated as a black circle in FIG. 21A, there is a high probability that among respective eight pixels in eight obtained images, two pixels will have a pixel value of intermediate gradation that corresponds to the intermediate point described above. On the other hand, when it is assumed that imaging has been performed seven times at the timings illustrated as a black circle in FIG. 21B, there is a high probability that among respective seven pixels in seven obtained images, at least one pixel will have a pixel value of intermediate gradation that corresponds to the intermediate point described above.

As described above, such a pixel value of intermediate gradation affects dispersion, and this results in a decrease in the accuracy of defect detection. Accordingly, it is desirable that dispersion be calculated only for a selected optimal sampling candidate by eliminating such a pixel value of intermediate gradation from sampling candidates of dispersion calculation. Specifically, when an even number of original images are to be combined in one period of an illumination pattern, two pixel values of intermediate gradation may be eliminated from pixel values of a plurality of pixels, and dispersion may be calculated. When an odd number of original images are to be combined, one pixel value of intermediate gradation may be eliminated from pixel values of a plurality of pixels, and dispersion may be calculated. As described above, a pixel value of intermediate gradation is eliminated from sampling candidates of dispersion calculation, and dispersion is calculated only for a selected optimal sampling candidate. Therefore, a statistical dispersion value is calculated by only using the optimal sampling candidate, and an influence of a pixel eliminated from sampling candidates can be removed. Thus, even in a case where a small number of images are to be combined, a composite image that enables a defect to be detected with high accuracy can be generated.

Figure 22:
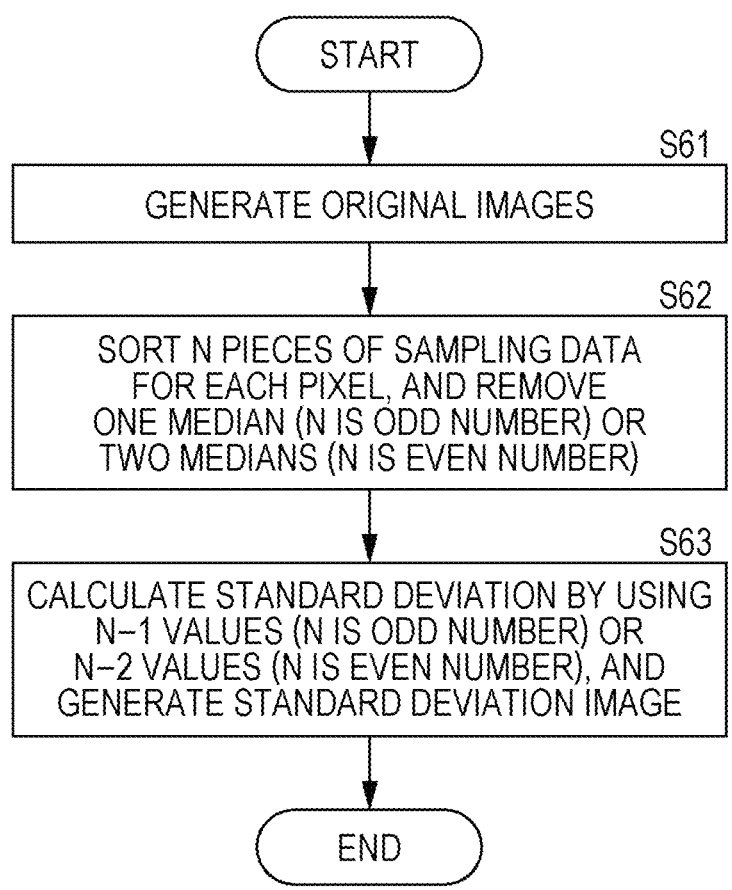
FIG. 22 is a flowchart illustrating another example of the standard deviation image generation processing.

FIG. 22 is a flowchart illustrating processing for generating a standard deviation image by eliminating a pixel value of intermediate gradation from sampling candidates of dispersion calculation and calculating dispersion only for a selected optimal sampling candidate.

In step S61, plural number of original images (N images) are generated, and in step S62, pieces of sampling data serving as pixel values for the N images are sorted for each of the pixels in each of the images, and one median (N is an odd number) or two medians (N is an even number) are removed.

Next, in step S63, a standard deviation is calculated for each of the pixels by using N−1 values (N is an odd number) or N−2 values (N is an even number).

It is desirable that the standard deviation obtained as described above be normalized, and a composite image is generated on the basis of the result. Note that it is sufficient if similar calculation is performed in a case where variance or half width is used as a statistical dispersion value.

[4-2] Another Embodiment 2 Relating to Standard Deviation Image

In this embodiment, similarly, imaging is performed plural times (N times) in one period of an illumination pattern. N may be a small number.

In this embodiment, similarly to the case of the other embodiment 1 relating to a standard deviation image, when an odd number of original images are to be combined in one period of the illumination pattern, a standard deviation is calculated for each of the pixels by using N−1 pieces of sampling data (pixel values). When an even number of original images are to be combined, a standard deviation is calculated by using N−2 pieces of sampling data. Stated another way, in the case of an odd number, a standard deviation is calculated for each of the pixels by using a combination (NCN−1)) of N−1 pixel values selected from N pixel values. In the case of an even number, a standard deviation is calculated for each of the pixels by using a combination (NCN−2)) of N−2 pixel values selected from N pixel values. Then, from among (NCN−1)) or (NCN−2)) standard deviations that have been obtained for each of the pixels, a maximum standard deviation is determined as a standard deviation for a corresponding pixel (maximum value processing).

Figure 23:
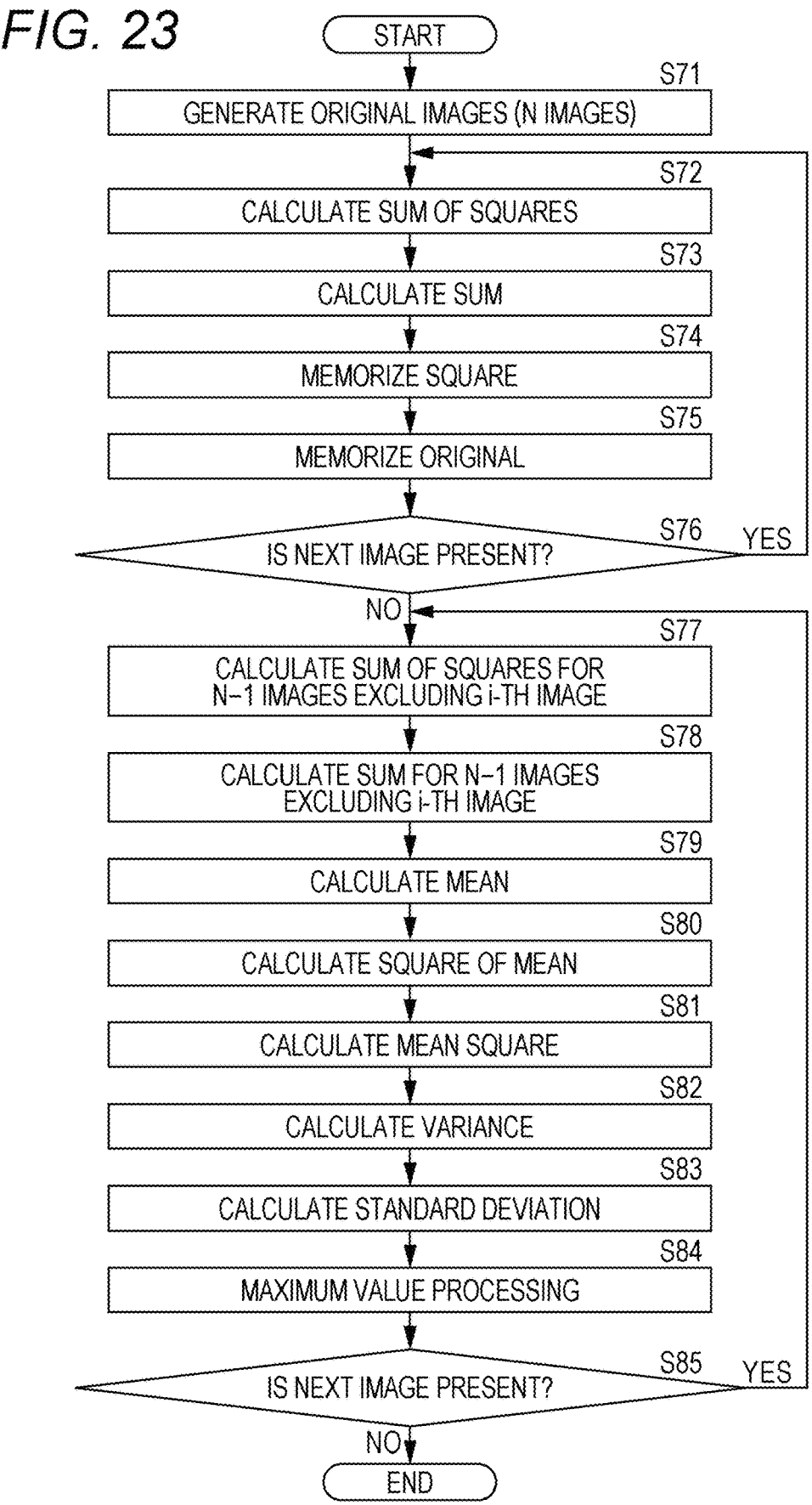
FIG. 23 is a flowchart illustrating another example of the standard deviation image generation processing.

The processing described above is illustrated in the flowchart of FIG. 23. The processing of FIG. 23 indicates a case where the number N of original images to be combined is an odd number, but the similar is applied to the case of an even number.

In step S71, original images (N images) to be combined are generated. In step S72, the sum of squares of pixel values is calculated for each pixel in a first original image, and in step S73, the sum of pixel values is calculated for each of the pixels. In calculating both the sum of squares and the sum for the first original image, a result of only the first original image is obtained. In step S74, a square value of each of the pixel values in the first image is stored, and in step S75, each of the pixel values (original) in the first image is stored.

Next, in step S76, whether the next image is present is checked. If the next image is present (YES in step S76), the processing returns to step S72, and a pixel value of each of the pixels in a second image is squared, and a result is added to a square value of each of the corresponding pixel values of the first image Next, in step S73, each of the pixel values of the second image is added to each of the corresponding pixel values of the first image. Further, in step S74, a square value of each of the pixel values in a second image is stored, and in step S75, each of the pixel values (original) in the second image is stored.

Such processing is sequentially performed on the N images, and the sum of squares of respective pixel values and the sum of the respective pixel values are calculated for each of the corresponding pixels of the N images. In addition, each of a square value and a pixel value (original) of each of the pixel values in each of the N images is stored.

When the processing described above has been performed on the N images (NO in step S76), in step S77, first, a square value of each of the pixels in a first image (i=1), where i is a variable, is subtracted from the sums of squares of a pixel value of each of the pixels in all of the N images that have been calculated in step S72, and the sums of squares for N−1 images are calculated for each of the pixels.

Next, in step S78, each of the pixel values in the first image is subtracted from the sums of pixel values in all of the images that have been calculated in step S73, and the sums for the N−1 images are calculated. In step S79, a mean of the sums for the N−1 images that have been calculated in step S78 is calculated, and in step S80, the square of the mean of the sums is calculated.

Next, in step S81, a mean square serving as a mean value of the sums of squares for the N−1 images that have been calculated in step S77 is calculated, and in step S82, variance is obtained according to the formula {(mean square)−(square of mean)}. Then, in step S83, a standard deviation serving as the square root of variance. is obtained.

Next, in step S84, maximization processing is performed. Here, only one standard deviation for each of the pixels has been obtained, and this value is a maximum.

Next, in step S85, it is checked whether the next image to be subtracted is present, that is, whether i=N is established. If the next image is present, and stated another way, if i=N is not established (YES in step S85), the processing returns to step S77, setting is performed in such a way that i=2, the sum of squares and a pixel value of each of the pixel values in the second image are subtracted, and a standard deviation is calculated similarly. In step S85, maximization processing is performed. In maximization processing, a standard deviation at the time of subtracting the first image is compared with a standard deviation at the time of subtracting the second image, and a larger standard deviation is employed.

As described above, the sum of squares and a pixel value of each of the images are sequentially subtracted until i=N is established, and in other words, from the first image to an N-th image, a standard deviation is calculated for each of the pixels, and a maximum standard deviation is employed as a standard deviation of a corresponding pixel.

It is desirable that the standard deviation obtained as described above be normalized, and a composite image is generated on the basis of the result. Note that it is sufficient if similar calculation is performed in a case where variance or half width is used as a statistical dispersion value.

In this embodiment, a predetermined number of images of a plurality of images are sequentially eliminated from calculation targets, and a statistical dispersion value is calculated for each pixel. Therefore, an optimal sampling candidate can be easily selected. In addition, a maximum value of the calculated dispersion values is employed as a dispersion value for a corresponding pixel, and therefore a composite image having a higher SN ratio can be generated.

This embodiment has described a case where a plurality of images is obtained in one period of the bright-and-dark pattern of the illumination unit 6 while the workpiece 1 is being moved relative to the illumination unit 6 and a camera at predetermined speed.

However, a plurality of images in one period of the illumination pattern may be obtained by only moving the illumination unit 6 relative to the workpiece 1 and the camera 8, and a composite image for which dispersion such as a standard deviation has been calculated may be generated on the basis of the plurality of images described above.

It should be understood that terms and expressions used herein are used for explanation, and are not used for restrictive interpretation, any equivalents of characteristic matters indicated and described herein are not excluded, and various variations can be made without departing from the scope of the claims of the present invention.

Illustrated embodiments of the present invention have been described herein. However, the present invention is not limited to the embodiments described herein, and also include any embodiments that can be recognized by what are called those skilled in the art on the basis of this disclosure, and have equivalent elements, modifications, deletions, a combination (for example, a combination of features over various embodiments), improvements, and/or changes.

INDUSTRIAL APPLICABILITY

The present invention can be used to detect a surface defect of a workpiece such as a vehicle body.

REFERENCE SIGNS LIST

1 Workpiece
2 Moving mechanism
3 Illumination frame
4 Support stand
6 Illumination unit
7 Camera frame
8 Camera
21 Master PC
22 Defect detection PC
30 Tentative defect candidate
40 Estimated coordinates
221 Image obtaining unit
222 Tentative defect candidate extraction unit
223 Coordinate estimation unit
224 Defect candidate determination unit
225 Image group generation unit
226 Image composition unit
227 Defect detection unit

The invention claimed is:
1. A workpiece surface defect detection device comprising:
a first hardware processor that:
obtains a plurality of images indicating a portion to be measured of a workpiece serving as a target of detection of a surface defect, in a state where a bright-and-dark pattern of an illumination device is moved relative to the workpiece;
extracts a tentative defect candidate for each of the plurality of images that has been obtained;
determines the tentative defect candidate as a defect candidate, when among a plurality of images from which the tentative defect candidate has been extracted, a number of images including the tentative defect candidate is greater than or equal to a threshold that has been set in advance;

cuts out, for each of a plurality of the defect candidates determined, a predetermined region around the defect candidate as an estimated region from a plurality of images including the defect candidate, and generates a plurality of estimated region image groups;

combines a plurality of images including the defect candidate that has been determined, and generates a composite image by combining a plurality of estimated region images that has been generated, and generating the composite image, for each of the plurality of the defect candidates; and detects a defect on a basis of the composite image that has been generated, wherein when generating the composite image, the first hardware processor aligns the plurality of estimated region images to gain a maximum evaluation value from among a plurality of combinations obtained by respectively shifting the center coordinates of each of the plurality of images in X-coordinate and Y-coordinate directions.

2. The workpiece surface defect detection device according to claim 1, wherein the threshold is a first threshold, the first hardware processor cancels processing for determining the tentative defect candidate as the defect candidate when, in the processing for determining the tentative defect candidate as the defect candidate, the number of images including the tentative defect candidate has not reached a second threshold that has been set in advance to be smaller than the first threshold.

3. The workpiece surface defect detection device according to claim 1, wherein the composite image is at least any of a standard deviation image, a phase image, a phase difference image, a maximum value image, a minimum value image, and a mean value image.

4. The workpiece surface defect detection device according to claim 1, wherein when generating the composite image, the first hardware processor aligns the plurality of estimated region images by superimposing center coordinates of each of the plurality of images.

5. The workpiece surface defect detection device according to claim 4, wherein the first hardware processor corrects the center coordinates of each of the plurality of images on a basis of a position of each of the center coordinates from a boundary of a bright-and-dark pattern of each of the plurality of images that corresponds to the bright-and-dark pattern of the illumination device, and superimposes the center coordinates after correction.

6. The workpiece surface defect detection device according to claim 1, wherein the first hardware processor extracts the tentative defect candidate according to at least two types of routines including a routine for extracting a small defect and a processing routine for extracting a gradual convex defect, and corrects a defect size of the tentative defect candidate that has been detected according to a routine for the gradual convex defect.

7. The workpiece surface defect detection device according to claim 1, wherein the first hardware processor identifies filiform grains on a basis of an amount of deviation from circularity of a two-dimensional shape of a two-dimensional defect signal in a phase image of the defect candidate.

8. A workpiece surface inspection system comprising:
an illumination device that applies illumination light having a bright-and-dark pattern to a workpiece serving as a target of detection of a surface defect;
an imaging part that images reflected light from a portion to be measured of the workpiece of the illumination light applied by the illumination device;
a movement part that moves the bright-and-dark pattern applied by the illumination device relative to the workpiece;
a second hardware processor that controls the imaging part to image the portion to be measured of the workpiece, while causing the movement part to move the bright-and-dark pattern applied by the illumination device relative to the workpiece; and
the workpiece surface defect detection device according to claim 1, wherein
the first hardware processor obtains, from the imaging part, a plurality of images indicating the portion to be measured of the workpiece.

9. A workpiece surface defect detection device comprising:
a first hardware processor that:
obtains a plurality of images indicating a portion to be measured of a workpiece serving as a target of detection of a surface defect, in a state where a bright-and-dark pattern of an illumination device is moved relative to the workpiece;
extracts a tentative defect candidate for each of the plurality of images that has been obtained;
determines the tentative defect candidate as the defect candidate, when among the plurality of images, a number of images that correspond to a position of the tentative defect candidate is greater than or equal to a threshold that has been set in advance;
cuts out, for each of a plurality of the defect candidates determined, a predetermined region around the defect candidate as an estimated region from a plurality of images including the defect candidate, and generates a plurality of estimated region image groups;
combines a plurality of images including the defect candidate that has been determined, and generates a composite image by combining a plurality of estimated region images that has been generated, and generating the composite image, for each of the plurality of the defect candidates; and
detects a defect on a basis of the composite image that has been generated, wherein
when generating the composite image, the first hardware processor aligns the plurality of estimated region images to gain a maximum evaluation value from among a plurality of combinations obtained by respectively shifting the center coordinates of each of the plurality of images in X-coordinate and Y-coordinate directions.

10. The workpiece surface defect detection device according to claim 9, wherein
the position of the tentative defect candidate is indicated by coordinates of the tentative defect candidate,
the first hardware processor obtains the coordinates of the tentative defect candidate that has been extracted, and obtains estimated coordinates for each of a plurality of images that follows an image from which the tentative defect candidate has been extracted, by computing which coordinates the coordinates of the tentative defect candidate will move to, and
the first hardware processor determines, in each of the plurality of images that follows, whether the estimated coordinates that have been computed correspond to the tentative defect candidate in a corresponding image, and determines the tentative defect candidate as the defect candidate, when among the plurality of images that follows, a number of images in which the estimated coordinates correspond to the tentative defect candidate is greater than or equal to a threshold that has been set in advance.

11. The workpiece surface defect detection device according to claim 9, wherein the first hardware processor extracts the tentative defect candidate according to at least two types of routines including a routine for extracting a small defect and a processing routine for extracting a gradual convex defect, and corrects a defect size of the tentative defect candidate that has been detected according to a routine for the gradual convex defect.

12. The workpiece surface defect detection device according to claim 9, wherein the first hardware processor identifies filiform grains on a basis of an amount of deviation from circularity of a two-dimensional shape of a two-dimensional defect signal in a phase image of the defect candidate.

13. A workpiece surface defect detection method comprising:
obtaining, by a workpiece surface defect detection device, a plurality of images indicating a portion to be measured of a workpiece serving as a target of detection of a surface defect, in a state where a bright-and-dark pattern of an illumination device is moved relative to the workpiece;
extracting, by the workpiece surface defect detection device, a tentative defect candidate for each of the plurality of images that has been obtained in the obtaining;
determining, by the workpiece surface defect detection device, the tentative defect candidate as a defect candidate, when among a plurality of images from which the tentative defect candidate has been extracted in the extracting, a number of images including the tentative defect candidate is greater than or equal to a threshold that has been set in advance;
cutting out, by the workpiece surface defect detection device, for each of a plurality of the defect candidates determined in the determining, a predetermined region around the defect candidate as an estimated region from a plurality of images including the defect candidate, and generating a plurality of estimated region image groups;
combining, by the workpiece surface defect detection device, a plurality of images including the defect candidate that has been determined in the determining, and generating a composite image by combining a plurality of estimated region images that has been generated in the cutting out, and generating the composite image, for each of the plurality of the defect candidates; and
detecting, by the workpiece surface defect detection device, a defect on a basis of the composite image that has been generated in the combining, wherein
when the composite image is generated, the plurality of estimated region images is aligned to gain a maximum evaluation value from among a plurality of combinations obtained by respectively shifting the center coordinates of each of the plurality of images in X-coordinate and Y-coordinate directions.

14. The workpiece surface defect detection method according to claim 13, wherein the threshold is a first threshold, the determining cancels processing for determining the tentative defect candidate as the defect candidate when, in the processing for determining the tentative defect candidate as the defect candidate, the number of images including the tentative defect candidate has not reached a second threshold that has been set in advance to be smaller than the first threshold.

15. The workpiece surface defect detection method according to claim 13, wherein the composite image is at least any of a standard deviation image, a phase image, a phase difference image, a maximum value image, a minimum value image, and a mean value image.

16. The workpiece surface defect detection method according to claim 13, wherein in the combining, when the composite image is generated, the plurality of estimated region images is aligned by superimposing center coordinates of each of the plurality of images.

17. The workpiece surface defect detection method according to claim 16, wherein in the combining, the center coordinates of each of the plurality of images are corrected on a basis of a position of each of the center coordinates from a boundary of a bright-and-dark pattern of each of the plurality of images that corresponds to the bright-and-dark pattern of the illumination device, and the center coordinates after correction are superimposed.

18. The workpiece surface defect detection method according to claim 13, wherein in the extracting, the tentative defect candidate is extracted according to at least two types of routines including a routine for extracting a small defect and a processing routine for extracting a gradual convex defect, and a defect size of the tentative defect candidate that has been detected according to a routine for the gradual convex defect is corrected.

19. The workpiece surface defect detection method according to claim 13, wherein in the detecting, filiform grains are identified on a basis of an amount of deviation from circularity of a two-dimensional shape of a two-dimensional defect signal in a phase image of the defect candidate.

20. A non-transitory recording medium storing a computer readable program that causes a computer to perform the workpiece surface defect detection method according to claim 13.

21. A workpiece surface defect detection method comprising:
obtaining, by a workpiece surface defect detection device, a plurality of images indicating a portion to be measured of a workpiece serving as a target of detection of a surface defect, in a state where a bright-and-dark pattern of an illumination device is moved relative to the workpiece;
extracting, by the workpiece surface defect detection device, a tentative defect candidate for each of the plurality of images that has been obtained in the obtaining;
determining, by the workpiece surface defect detection device, the tentative defect candidate as the defect candidate, when among the plurality of images, a number of images that correspond to a position of the tentative defect candidate is greater than or equal to a threshold that has been set in advance;
cutting out, by the workpiece surface defect detection device, for each of a plurality of the defect candidates determined in the determining, a predetermined region around the defect candidate as an estimated region from a plurality of images including the defect candidate, and generating a plurality of estimated region image groups;
combining, by the workpiece surface defect detection device, a plurality of images including the defect candidate that has been determined in the determining, and generating a composite image by combining a plurality of estimated region images that has been generated in the cutting out, and generating the composite image, for each of the plurality of the defect candidates; and detecting, by the workpiece surface defect detection device, a defect on a basis of the composite image that has been generated in the combining, wherein when the composite image is generated, the plurality of estimated region images is aligned to gain a maximum evaluation value from among a plurality of combinations obtained by respectively shifting the center coordinates of each of the plurality of images in X-coordinate and Y-coordinate directions.

22. The workpiece surface defect detection method according to claim 21, wherein the position of the tentative defect candidate is indicated by coordinates of the tentative defect candidate, the method further includes obtaining the coordinates of the tentative defect candidate that has been extracted in the extracting, and obtaining estimated coordinates for each of a plurality of images that follows an image from which the tentative defect candidate has been extracted, by computing which coordinates the coordinates of the tentative defect candidate will move to, and in the determining, in each of the plurality of images that follows, it is determined whether the estimated coordinates that have been computed in the obtaining correspond to the tentative defect candidate in a corresponding image, and the tentative defect candidate is determined as the defect candidate, when among the plurality of images that follows, a number of images in which the estimated coordinates correspond to the tentative defect candidate is greater than or equal to a threshold that has been set in advance.

23. The workpiece surface defect detection method according to claim 21, wherein in the extracting, the tentative defect candidate is extracted according to at least two types of routines including a routine for extracting a small defect and a processing routine for extracting a gradual convex defect, and a defect size of the tentative defect candidate that has been detected according to a routine for the gradual convex defect is corrected.

24. The workpiece surface defect detection method according to claim 21, wherein in the detecting, filiform grains are identified on a basis of an amount of deviation from circularity of a two-dimensional shape of a two-dimensional defect signal in a phase image of the defect candidate.

* * * * *